(12) United States Patent
McNeely

(10) Patent No.: US 6,217,010 B1
(45) Date of Patent: Apr. 17, 2001

(54) SUSPENSION AND A DYNAMIC LOAD-COMPENSATING FLUID SPRING THEREFOR

(76) Inventor: P. Dennis McNeely, 5137 Pontiac Trail, Ann Arbor, MI (US) 48105

(*) Notice: Subject to any disclaimer, the term of this patent is extended or adjusted under 35 U.S.C. 154(b) by 0 days.

(21) Appl. No.: 09/286,859

(22) Filed: Apr. 6, 1999

Related U.S. Application Data

(60) Provisional application No. 60/081,001, filed on Apr. 7, 1998.

(51) Int. Cl.[7] ................................................. B60G 17/00
(52) U.S. Cl. ................................. 267/64.16; 267/64.11; 267/64.17; 267/DIG. 1; 280/6.157
(58) Field of Search .................... 267/64.11, 64.16, 267/64.17, 136, DIG. 1, DIG. 2; 188/314, 269, 318, 319.1, 319.2, 282.1, 281, 266.1, 266.2; 280/6.159, 6.157, 124.157, 124.16, 124.161

(56) References Cited

U.S. PATENT DOCUMENTS

| | | | |
|---|---|---|---|
| Re. 27,623 | 4/1973 | Millican | 280/124 A |
| 2,650,108 | 8/1953 | Bruce | 280/124 |
| 3,033,556 | 5/1962 | Wössner | 267/64 |
| 3,278,197 | 10/1966 | Gerin | 280/124 |
| 3,376,032 | 4/1968 | Schmid | 267/8 |
| 3,391,921 | 7/1968 | Axthammer | 267/64 |
| 3,480,269 | 11/1969 | Jewell et al. | 267/64 |
| 3,533,425 | 10/1970 | Hannan | 137/46 |
| 3,550,994 | 12/1970 | Henry-Biabaud | 280/6.11 |
| 3,582,106 | 6/1971 | Keijzer | 280/124 |
| 3,649,043 | 3/1972 | Higginbotham et al. | 280/124 F |
| 3,649,044 | 3/1972 | Higginbotham | 280/124 F |
| 3,677,561 | 7/1972 | McNally | 280/124 F |
| 3,807,717 | * 4/1974 | Ito | 267/64.19 |
| 3,810,611 | * 5/1974 | Ito et al. | 267/64.16 |
| 3,831,969 | 8/1974 | Lindblom | 280/124 F |
| 3,836,132 | 9/1974 | McNally et al. | 267/64 R |
| 3,871,681 | 3/1975 | Piniot | 280/124 F |
| 3,937,450 | 2/1976 | Bauer | 267/113 |
| 3,941,403 | * 3/1976 | Hiruma | 267/64.16 |
| 3,990,687 | 11/1976 | Curnutt | 267/8 A |
| 4,061,320 | 12/1977 | Warner | 267/64 R |
| 4,095,822 | 6/1978 | Thornhill | 280/702 |
| 4,172,588 | 10/1979 | Ganoung | 267/11 A |
| 4,214,775 | * 7/1980 | Taft | 267/64.19 |
| 4,328,960 | 5/1982 | Handke et al. | 267/8 R |
| 4,477,045 | * 10/1984 | Karasawa et al. | 248/1 |
| 4,497,505 | 2/1985 | Harrison et al. | 280/698 |
| 4,545,602 | 10/1985 | Shibahata | 280/701 |
| 4,573,702 | 3/1986 | Klem | 280/697 |
| 4,579,366 | 4/1986 | Doi et al. | 280/707 |
| 4,589,528 | 5/1986 | Axthammer et al. | 188/279 |
| 4,593,920 | 6/1986 | Natsume et al. | |
| 4,685,698 | 8/1987 | Klinkner et al. | 280/707 |

(List continued on next page.)

Primary Examiner—Robert J. Oberleitner
Assistant Examiner—Mariano Sy
(74) Attorney, Agent, or Firm—Rader, Fishman, Grauer & McGarry An Office of Rader, Fishman & Grauer PLLC

(57) ABSTRACT

An apparatus and method for supporting a dynamic load relative to a foundation, such as a vehicle relative to the road, by a hydraulic system that monitors the movement of the load and adds or removes hydraulic fluid from the system to compensate for the load change. The hydraulic system is preferably one or more hydraulic cylinders that have a first chamber operably connected to the load and a second chamber operably connected to the foundation. The first and second chamber are connected by a valve. The valve is connected to the second chamber and a source of pressurized fluid with a reservoir. The first chamber senses the load change and the valve adds fluid from the pressurized fluid source to the second chamber or removes fluid from the second chamber to the reservoir to compensate for the change in the load and maintain the load in substantially the same position relative to the foundation.

62 Claims, 13 Drawing Sheets

U.S. PATENT DOCUMENTS

| | | | |
|---|---|---|---|
| 4,693,185 | 9/1987 | Easton et al. | 105/199.2 |
| 4,702,490 * | 10/1987 | Yamaguchi et al. | 267/64.16 |
| 4,741,516 | 5/1988 | Davis | 267/64.13 |
| 4,756,548 | 7/1988 | Kaltenthaler et al. | 280/702 |
| 4,773,672 | 9/1988 | Deroche | 280/708 |
| 4,826,206 | 5/1989 | Immega | 280/711 |
| 4,836,575 | 6/1989 | Buma et al. | 280/702 |
| 4,867,474 | 9/1989 | Smith | 280/699 |
| 4,877,223 | 10/1989 | Hackett | 267/64.17 |
| 4,900,054 | 2/1990 | Kessler | 280/688 |
| 4,934,731 | 6/1990 | Hiwatashi et al. | 280/698 |
| 5,016,909 | 5/1991 | Lin | 280/707 |
| 5,037,128 | 8/1991 | Okuyama et al. | 280/703 |
| 5,042,782 | 8/1991 | Mintgen | 267/64.28 |
| 5,058,868 | 10/1991 | Sirven | 267/259 |
| 5,163,659 | 11/1992 | Lizell | 267/64.16 |
| 5,219,152 | 6/1993 | Derrien et al. | 267/64.15 |
| 5,222,759 | 6/1993 | Wanner et al. | 280/697 |
| 5,269,556 | 12/1993 | Heyring | 280/6.12 |
| 5,306,031 | 4/1994 | Quinn et al. | 280/688 |
| 5,342,023 | 8/1994 | Kuriki et al. | 267/64.17 |
| 5,401,053 | 3/1995 | Sahm et al. | 280/707 |
| 5,443,282 | 8/1995 | Gipser | 280/690 |
| 5,447,332 | 9/1995 | Heyring | 280/772 |
| 5,480,188 | 1/1996 | Heyring | 280/772 |
| 5,486,018 | 1/1996 | Sakai | 280/714 |
| 5,556,115 | 9/1996 | Heyring | 280/6.12 |
| 5,562,305 | 10/1996 | Heyring | 280/772 |
| 5,566,970 | 10/1996 | Lin | 280/689 |
| 5,573,266 | 11/1996 | Zalewski et al. | 280/704 |
| 5,584,498 | 12/1996 | Danek | 280/714 |
| 5,588,510 | 12/1996 | Wilke | 188/299 |
| 5,601,306 | 2/1997 | Heyring | 280/702 |
| 5,601,307 | 2/1997 | Heyring et al. | 280/707 |
| 5,651,555 | 7/1997 | O'Reilly et al. | 280/6.1 |
| 5,664,649 | 9/1997 | Thompson et al. | 188/314 |
| 5,725,239 | 3/1998 | de Molina | 280/711 |
| 5,871,217 * | 2/1999 | Blanz | 267/64.16 |

* cited by examiner

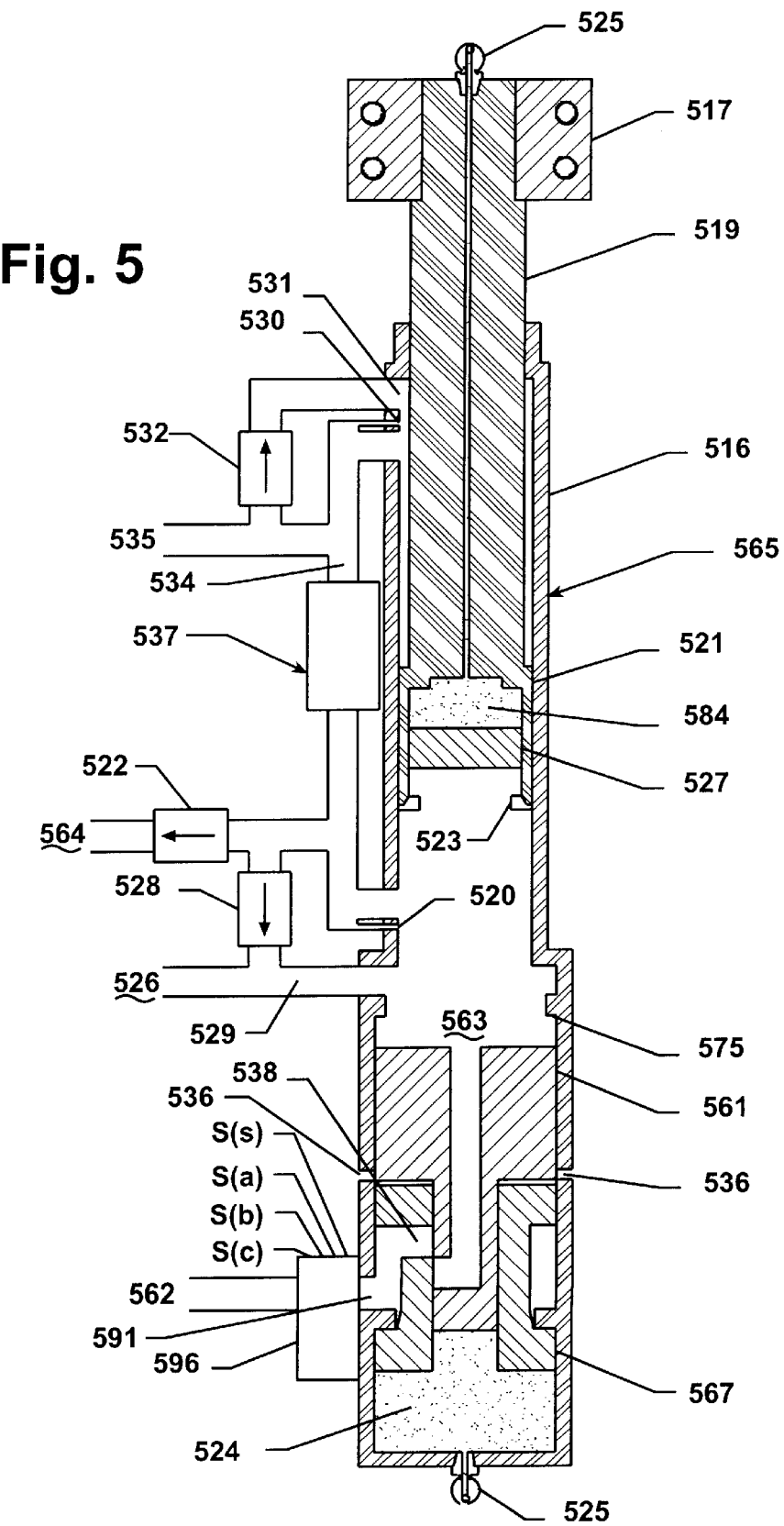

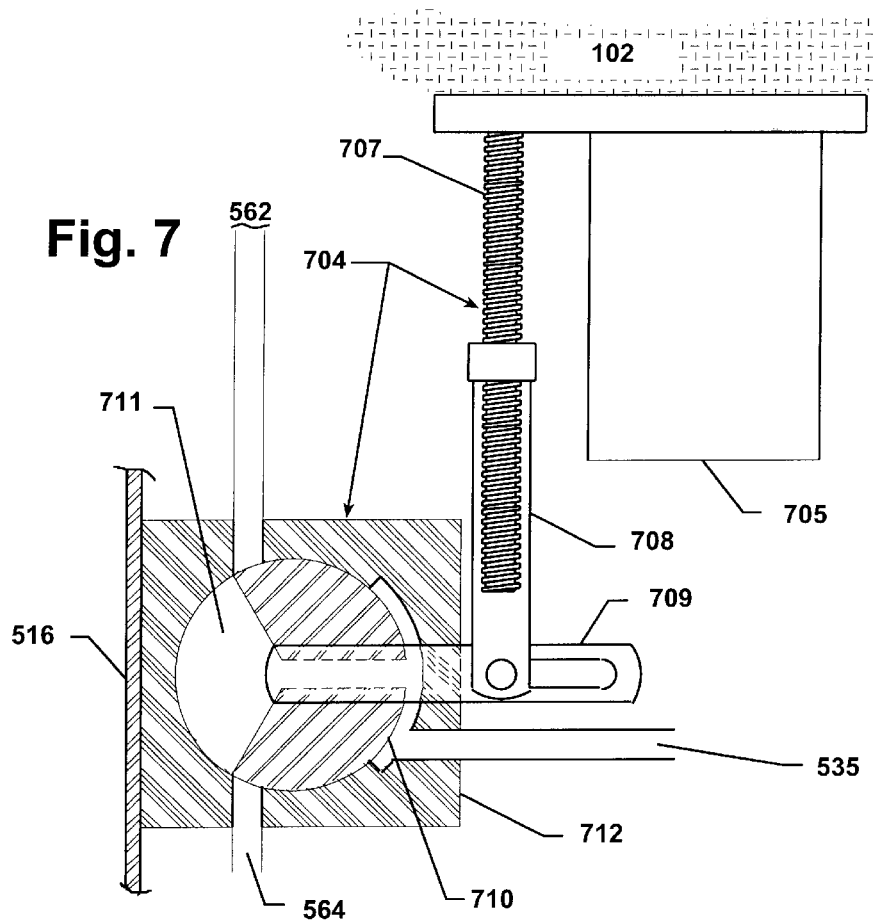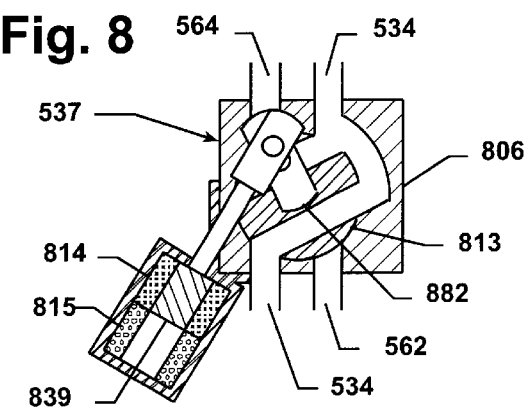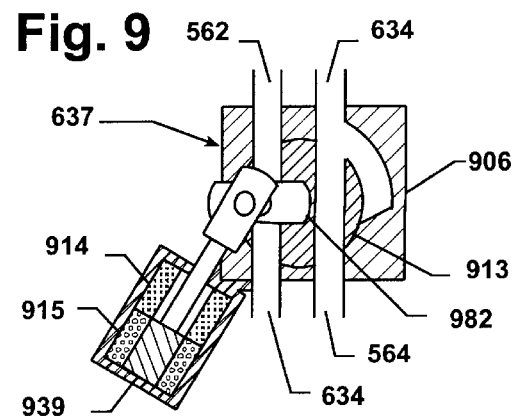

SUSPENSION AND A DYNAMIC LOAD-COMPENSATING FLUID SPRING THEREFOR

CROSS-REFERENCE TO RELATED APPLICATIONS

This application claims the benefit of U.S. Application No. 60/081,001, filed Apr. 7, 1998.

BACKGROUND OF THE INVENTION

1. Field of the Invention

This invention relates to an apparatus and a method of supporting a load (such as an automobile) that is subject to rapid weight fluctuations (due to braking, cornering, accelerating, pulling a trailer, etc.). The support is precisely matched to the weight of the load at each instant, and substantially eliminates both vibration and disturbance otherwise caused by road irregularities.

2. Description of the Related Art

Suspension systems in use today are compromised in their design due to the wide variety of conditions that they must accommodate. The weight of passengers and cargo varies widely, as do loads imposed by yawing, pitching, and rolling forces. Compromises have resulted in instability while cornering and/or braking, changing vehicle height under varying loads, and unchanging vehicle height at widely varying speeds. For example, great handling, sleek, low slung sports cars can be difficult to enter or exit and high load capacity trucks with elevated beds can be difficult to load and unload. Either the sports car or the truck driver may find it difficult to access drive up windows or automated teller machines.

Numerous designs have been proposed to alleviate problems and shortcomings with conventional suspensions. Some have advocated the use of complex sensors and control units (e.g. U.S. Pat. No. 5,037,128 to Okuyama et al., issued Aug. 6, 1991. Others have required the combined use of hydraulics, pneumatics, and electronics to relieve some of the symptoms of compromise (e.g U.S. Pat. No. 4,934,731 to Hiwatashi et al., issued Jun. 19, 1990). Most of the efforts to address the ideal suspension have been addressed in a piecemeal fashion. Several patents address forces generated while turning, accelerating, or braking (U.S. Pat. No. 5,566,970 to Lin, issued Oct. 22, 1996, U.S. Pat. No. 5,401,053 to Sahm et al., issued Mar. 28, 1995, and U.S. Pat. No. 4,573,702 to Klem, issued Mar. 4, 1986). Other patents addressed ride height controls as well (U.S. Pat. No. 5,222,759 to Wanner, issued Jun. 29, 1993, U.S. Pat. No. 4,867,474 to Smith, issued Sep. 19, 1989, or U.S. Pat. No. 3,831,969 to Lindblom, issued Aug. 27, 1974).

Citroën installed hydro-pneumatic suspensions in production cars, typified by the prior art shown in FIG. 1A. The hydro-pneumatic suspension of FIG. 1 comprises a hydro-pneumatic spring 1A10 that supports a portion of a vehicle frame 1A17, which carries part of the vehicle load.

The pneumatic spring comprises a case consisting of a hollow cylindrical body, open at one end and having small, restricted openings 1A49 through a circular disk that otherwise closes the other end of the body. The cylinder is designed to contain fluid under pressure, and has an additional opening in the side of the cylinder near the closed end fluidly connected to a passage 1A35. The restricted openings and side opening provide fluid paths for the admission or release of pressurized fluid from the cylinder. The exterior radial surface of the case has an integral step 1A12 which provides a bearing surface for the frame member 1A17 to rest.

The frame member 1A17 provides support for a load, such as a vehicle (not shown), whose weight is transferred by the frame member to the integral step on the exterior radial surface of case 1A16.

A rod 1A19 is secured to and physically supports a piston 1A21. The rod is a structural member which maintains a specified spatial relationship between the piston 1A21 and a wheel support 1A40. The piston 1A21 slides within the interior bore of cylinder 1A16 yet maintains a pressure tight fit within the bore of the cylinder to provide a fluid seal between the cylinder 1A16 and piston 1A21.

A variable volume chamber 1A33 is defined by the space within case 1A16 between piston 1A21 and the closed end of case 1A16. The volume of the chamber 1A33 can be increased or decreased by forcing or releasing, respectively, pressurized fluid into the chamber through either the cylinder side opening or through the restricted openings. The variation in the volume of the chamber is reflected in the movement of piston 1A21 within the case 1A16.

Passage 1A35 fluidly connects a valve (not shown) to the variable volume chamber through the cylinder side opening. The valve controls the admission of fluid into variable volume chamber 1A33 or the release of fluid from the chamber. Movement of fluid through passage 1A35 varies the length or separation of wheel support 1A40 relative to the case 1A16 and, thus, relative to the frame 1A17 under static conditions.

The wheel support 1A40 is secured to the end of rod 1A19 opposite piston 1A21 and configured to be secured to a wheel assembly to support the frame and its load relative to the ground.

A compressible gas 1A47 is contained within a pressure accumulator 1A84. The compressible gas is isolated from the operating fluid in the lower half of the pressure accumulator and in variable volume chamber 1A33 by a membrane 1A51. The expansion and contraction of the compressible gas results from movement of fluid through the restricted openings in the closed end of case 1A16. The pressure accumulator 1A84 provides an air spring for the operation of the prior art suspension. When the wheel assembly encounters a bump, the wheel support, rod, and piston are all pushed up against the downward force of the load. This forces operating fluid up through the restricted openings, and compresses the compressible gas. Conversely, the compressible gas in the pressure accumulator forces fluid back into the variable volume chamber once the wheel assembly crests the bump, extending the piston back to its original position. The restricted openings 1A49 allow the operating fluid to pass between the pressure accumulator and the variable volume chamber at a predetermined rate.

A check valve 1A57 restricts fluid flows between the pressure accumulator and the case through the restricted openings.

A hydro-pneumatic spring similar to that shown in FIG. 1A has been used as an automotive suspension for a number of years. The vehicle is supported on the frame member 1A17, which is in turn supported by a case 1A16 containing pressurized hydraulic fluid. The pressurized fluid is contained in a variable volume chamber 1A33 that is defined by case 1A16 and piston 1A21. The piston can slide in the bore of case 1A16 while maintaining a pressure tight seal with the bore of the case. Pressurized fluid may be added or released from the variable volume chamber through passage 1A35, raising or lowering the vehicle with respect to wheel support 1A40. Fluid in the variable volume chamber is supported by piston 1A21, which in turn is supported by wheel support 1A40 through rod 1A19. Restricted openings 1A49 permit fluid flow between the variable volume chamber 1A33 and pressure accumulator 1A84 through check valve 1A57. Fluid that flows into or out of the pressure accumulator displaces bladder 1A51, causing compressible gas 1A47 to compress or expand.

The operation of the prior art fluid spring combined the features of an air spring (pressure accumulator 1A84), a hydraulic level control (piston 1A21 and rod 1A19 moving within case 1A16 as fluid is admitted or released through passage 1A35), and a shock absorber (restricted openings 1A49 and check valve 1A57 dampen the vertical motion of wheel support 1A40). The fluid in variable volume chamber 1A33 both supports the vehicle at varying extensions of rod 1A19 and acts as a transmission medium between piston 1A21 and bladder 1A51, causing compressible gas 1A47 to compress or expand as wheel support 1A40 absorbs bumps. In this manner the height of the frame member 1A17 is controlled, and road shock is isolated from it.

SUMMARY OF THE INVENTION

The Dynamic Load-Compensating Fluid Spring acts as a 'one way' spring in supporting loads. Dynamic load variations (e.g. acceleration, cornering, or braking) and static load variations (driving without a cargo or hauling a full load) can be supported by the fluid spring without significant sagging. The support offered by the fluid spring nearly matches the magnitude of the load at each instant, allowing the spring to absorb raised bumps in the road without the progressively increasing resistance associated with a helical, leaf, or torsion spring.

Conversely, the biased action of the fluid spring suggests that inverting the fluid spring will provide steady support for stationary equipment (presses, etc.) while absorbing shock resulting from their operation. One such equipment support is shown in FIG. 12.

The present invention provides a method of supporting a load in which the amount of support given to the load is directly proportional to the magnitude of the load at each instant in time. The method of support will absorb forces axial to the support which act directly on the support.

This method of support allows the development of vehicular suspensions which will not compress when subjected to forces generated in cornering, accelerating, braking, etc., but which will compress freely when encountering raised bumps in the surface of the road. Such suspensions may also incorporate the ability to 'carry' a tire over a hole at medium and high speeds (while traveling in a straight line), and the ability to force the tire to track through the hole at low speeds (or while maneuvering) to enhance the stability of the vehicle.

Other objects, features, and advantages of the invention will be apparent from the ensuing description in conjunction with the accompanying drawings.

BRIEF DESCRIPTION OF THE DRAWINGS

In the drawings:

FIGS. 5 and 6 illustrate a fifth embodiment of the dynamic load-compensating spring according to the invention, with FIG. 5 showing a cross section of a height-adjustable control cylinder and FIG. 6 showing a cross section of a rotatable support cylinder;

FIG. 7 shows a height control for the fifth embodiment;

FIG. 8 and FIG. 9 illustrate an embodiment of a solenoid-controlled fluid valve which converts the operation of the cylinders shown in FIG. 5 and FIG. 6 from a single acting cylinder to a double acting cylinder, enabling the cylinders to lift the axle and wheel assemblies attached thereto;

DETAILED DESCRIPTION OF THE PREFERRED EMBODIMENTS

Figure 1:
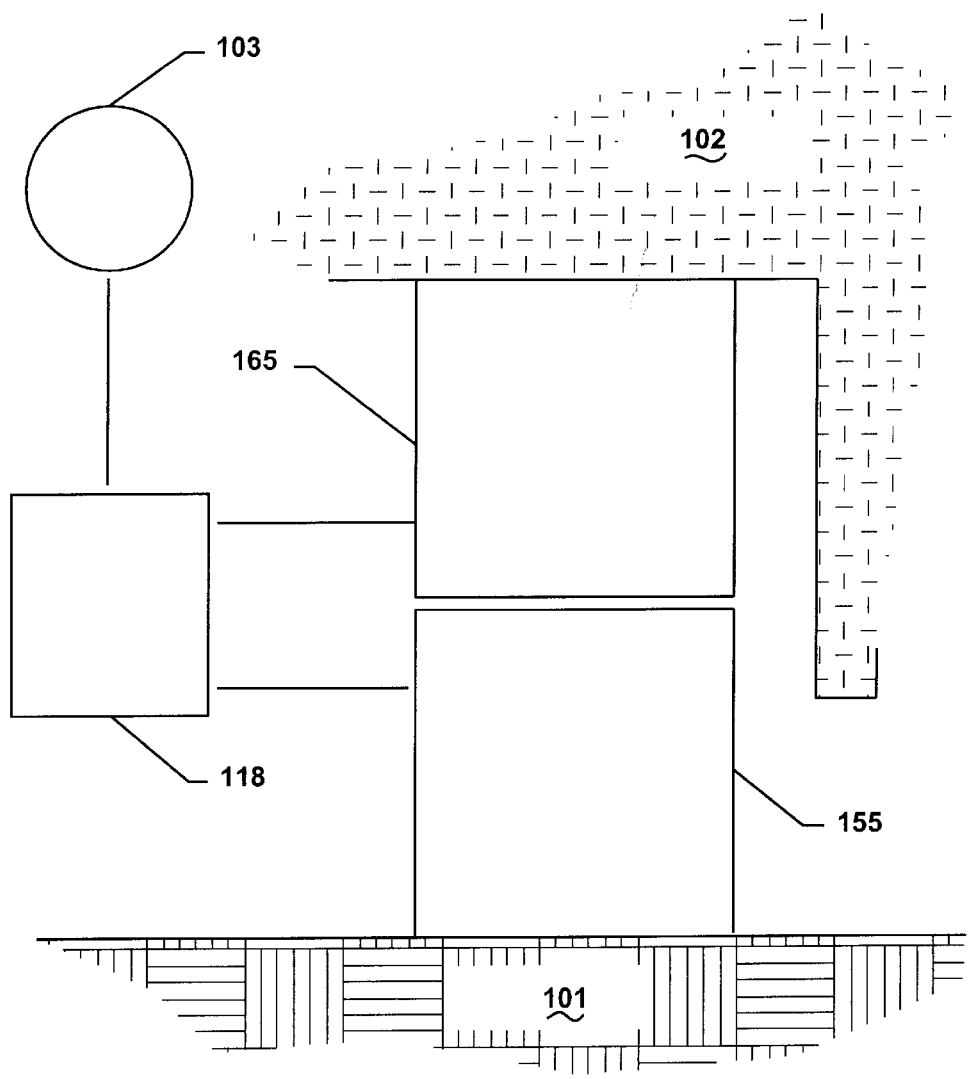
FIG. 1 shows a dynamic load-compensating fluid spring according to the invention.
Figure 1A:
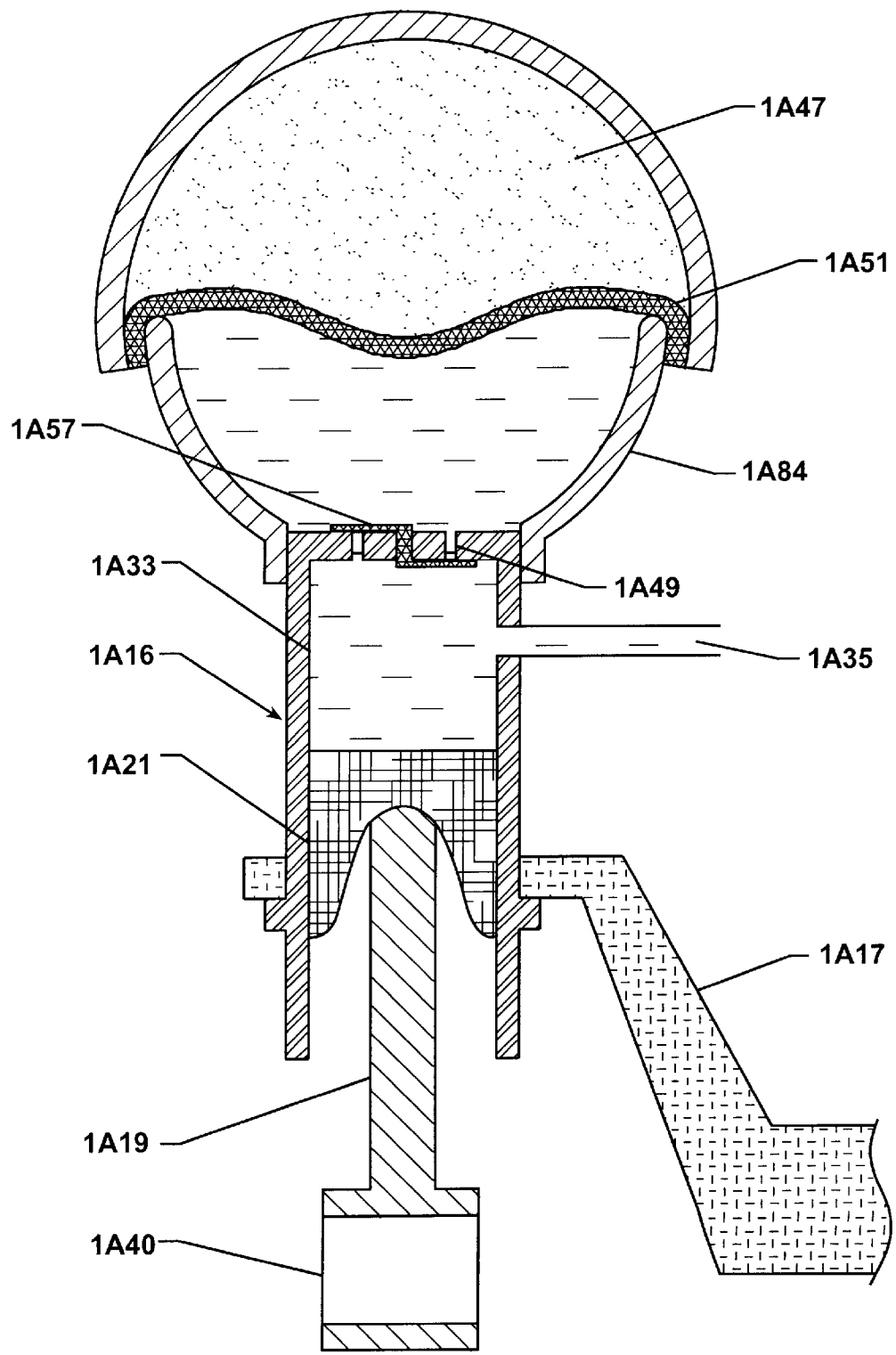
FIG. 1A shows a prior art hydro-pneumatic suspension.

The various parts of the drawing figures have been numbered in the following manner:

The last two digits of the part number reflect the function of the part; parts having the same function (in different drawings) have the same last two digits.

The first digit(s) reflect the figure number in which the part was first introduced.

For example, part 284 is first shown on drawing 2 (pressure accumulator) and part 584 is first shown on drawing 5 (pressure accumulator). Parts having the same function on the same drawing have the same number, with an "A" or a "B" suffix.

While the invention has been specifically described in connection with certain specific embodiments thereof, it is to be understood that this is by way of illustration and not of limitation, and the scope of the appended claims should be construed as broadly as the prior art will permit.

FIG. 1 illustrates a dynamic load-compensating fluid spring that supports a dynamic load 102 relative to a foundation 101. The dynamic load-compensating fluid spring comprises a motive force device 103 that supplies a motive force to a controller 118, which receives inputs indicative of the dynamic load from a load sensor 165 and controls an adjustable support 155 in response to the sensor input with the aid of the motive force device 103. The foundation 101 is normally steady, subject only to occasional movement which would cause unwanted disturbance of the dynamic load's inertial condition (e.g. an earthquake causing structural disturbance or damage). Alternately, the foundation may always be steady, and unwanted disturbance of the inertial condition of the dynamic load may result from movement of the dynamic load over irregularities in the surface of the foundation (e.g. a vehicle moving over the surface of a road).

The dynamic load 102, supported by the dynamic load-compensating fluid spring, is dynamic in the sense that either the mass of the load may vary (e.g. passengers, equipment, or fuel are added or removed), the center of gravity of the load may vary as its velocity or direction change, or the apparent weight of the load may vary as outside forces act on the dynamic load (wind loads, seismic activity, etc.).

The motive force device 103 provides fluid pressure, electrical power, and/or other such force as may be necessary to control the dynamic load 102 relative to the foundation by adjusting the support 155 as directed by the controller 118.

In operation, the controller 118 moderates the support of the dynamic load by the adjustable support 155 in accordance with the support data furnished continuously by the load sensor 165. The controller 118 preferably ensures that the support of the dynamic load 102 matches the mass of the dynamic load together with any apparent weight changes caused by movement of its center of gravity or by outside dynamic forces, as indicated above.

The adjustable support 155 provides support of the dynamic load 102 as moderated by the controller 118. The amount of support can be varied by altering the amount of lift generated by the adjustable support and/or by altering the length of the adjustable support in accordance with the desired operating characteristics of the dynamic load-compensating fluid spring.

Variations in the amount of lift generated by the adjustable support (as well as alterations in the length of the adjustable support) can be obtained by varying fluid pressures, magnetic attraction/repulsion, mechanical means, etc. Variations in the amount of lift generated by the adjustable support (and alterations in its length) can also be used to absorb forces external to the dynamic load, such as seismic activity or shocks induced by motion of the dynamic load over an irregular foundation.

The load sensor 165 monitors the total force of the dynamic load on the dynamic load-compensating fluid spring and provides that information to the controller 118 to ensure the support offered by the adjustable support accurately opposes the total force of the dynamic load. This information further enables the adjustable support to accurately absorb forces external to the dynamic load, as indicated above.

The dynamic load 102 is imposed on the load sensor 165, which isolates the forces originating in the dynamic load from forces caused by movement of a foundation 101 and an adjustable support 155 relative to one another. The motive force device 103 available to the controller 118 provides the force as directed by the controller to the adjustable support in a manner which ensures the support given by the adjustable support member is equal to the magnitude of the dynamic load. The controller 118 preferably ensures the adjustable support 155 provides a force equal and opposite to the magnitude of the dynamic load 102 at each moment, regardless of movement of the foundation 101 and the dynamic load relative to one another.

The generic design of such a load-compensating spring ensures that load sensor 165 monitors the magnitude of dynamic load 102 and passes such load information to controller 118. Controller 118 then directs the motive force device 103 to the adjustable support member 155, ensuring that the support of dynamic load 102 on foundation 101 nearly matches the magnitude of the dynamic load at each moment, regardless of motion of adjustable support 155 and foundation 101 relative to one another.

The various embodiments of such a generic design which follow incorporate pressure-tight telescopic cylinders for the adjustable support and for the load sensor. The concept could be embodied through the use of an adjustable support or load sensor which flexes as a knee or which varies the size of a flexible pressure tight container. Similarly, the adjustable support could consist of a linear electric motor or solenoid.

Alternate embodiments of the load sensor might consist of an array of piezo electric sensors capable of sensing both the load magnitude and the origin of forces which would vary the magnitude of the load. This information would be input to a computational device or compared to information in a look up table, ensuring that the support of the dynamic load matched its magnitude at each moment, while the adjustable support absorbed those forces which would otherwise alter the inertial state of the dynamic load.

Further, the embodiments which follow incorporate pressure accumulator(s) charged with pressurized gas; all other passages, valves, and voids within the respective cylinders are filled with hydraulic fluid. Note that pressure accumulation may be similarly accomplished using springs or other suitable resilient material. The desired operational characteristics of the fluid spring may require the use of other fluids (compressible liquids, incompressible liquids, or gasses) in various parts of the fluid spring.

Accordingly, the following descriptions simply refer to the use of fluid within all the components of all the embodiments of the fluid spring. Fluid seals are not specified in the following descriptions; their location and material specification is to be defined in accordance with industry standards for the pressures and fluid types specific to the design application.

The electrical valving, solenoids, and coils mentioned in various of the embodiments is powered by a source of electrical potential which is not shown; various applications may be best served by low voltage alternating current or direct current, or may be better suited to high voltage power supplies.

The design of the dynamic load-compensating fluid spring suggests that by admitting or releasing fluid to an active hydraulic system (rather than through restricted openings) and by reducing the size of the accumulator (to facilitate movement of the valving which controls fluid movement, and to absorb high frequency vibration in the fluid) a variety of benefits can be realized, as follows:

1. Immediate and accurate compensation for squatting, diving, and swaying forces without compromising the ride quality of the suspension, under a wide variety of load conditions.
2. The ability to compress to absorb raised bumps in the surface of the road without the progressively increasing resistance associated with conventional springs (helical, leaf, or torsion bars).
3. Enhancing the ride quality further by 'carrying' wheels over potholes when ever possible—but ensuring the wheels track through holes as necessary to maintain vehicle stability while cornering, accelerating, and braking. This further reduces the magnitude and frequency of stresses on the structure and occupants of the vehicle.

4. Allowing suspension designs in which the wheels track truly vertically through the entire range of the suspension's travel, and in which the steering linkage is isolated from the rapid vertical motion of the wheels.

5. Automatically regulating the height of the vehicle at all speeds and/or allowing manual control of its height at slow speeds, without compromising the features indicated above, allowing the following benefits:

Improved overall fuel economy, by providing optimal road clearance under various driving conditions and allowing the use of higher inflation pressures in tires (or the use of semi-pneumatic tires)

Improved alignment of structural members (bumpers and side impact beams)—in the event of a collision between vehicles so equipped, the safety of the occupants is maximized while damage to either vehicle is minimized Reduced front-end damage to body components which would otherwise be caused while parking Enhanced driving performance under adverse road conditions.

Simplified entry into low slung sports cars and easier loading or unloading of pickup trucks Ready access to 'drive-up' facilities (banks, fast-food restaurants, remote ATM machines, mail boxes, etc.) regardless of 'normal' vehicle height 6. Providing commercial vehicles with all the above features, and additionally allowing individual axles to be lifted and lowered, as dictated by load and driving conditions.

Figure 2:
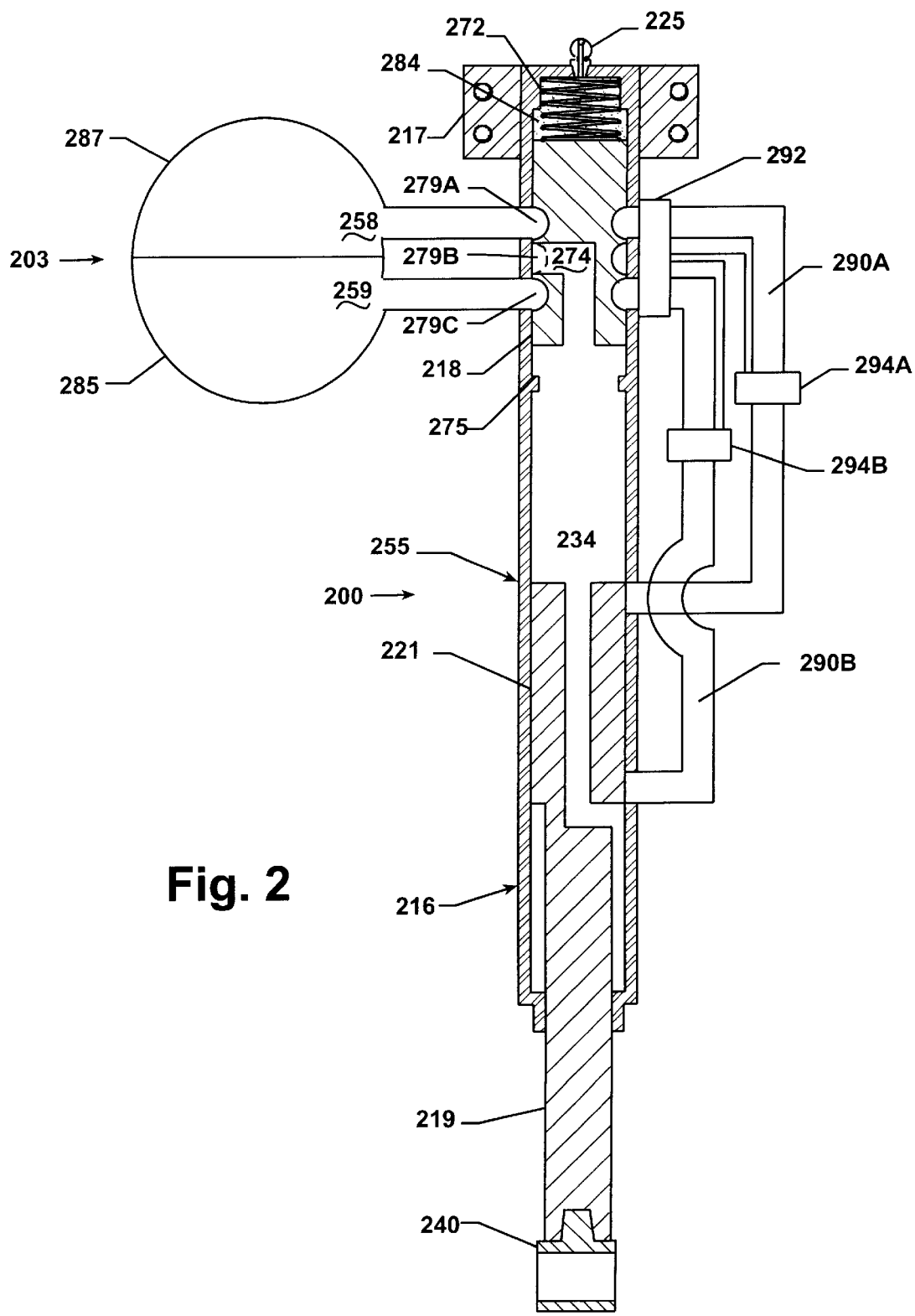
FIG. 2 illustrates a second embodiment of the dynamic load-compensating spring configured as a single cylinder that provides support equal to the magnitude of a dynamic load by adjusting the length and/or internal pressure of the cylinder.

FIG. 2 illustrates a specific implementation of the dynamic load-compensating fluid spring of FIG. 1; a spring cylinder 255. The second embodiment dynamic load-compensating fluid spring 200 supports a load, preferably a portion of a vehicle, carried by a frame member 217 and by a case 216 fixedly mounted on one end to the frame member and at its other end, reciprocally mounting a rod 219 adapted to mount a ground-engaging wheel assembly.

The case 216 consists of a hollow cylindrical pressure vessel, having an open end that receives reciprocating rod 219 extending from a piston 221 and a closed end fixedly mounted to the frame member 217.

A main valve 218 is mounted with the inner bore of the cylinder and consists of a solid cylindrical body having three channels routed around its radial surface; an annular channel 279B is routed around the central transverse plane of the cylindrical solid, an annular channel 279A is routed parallel to and just above channel 279B, and an annular channel 279C is routed parallel to and just below channel 279B. Additionally, channel 279B is connected to the bottom surface of main valve 218 by a passage 274, which extends axially upward from the bottom of the main valve to the center transverse plane, where it turns and extends radially to meet channel 279B. The main valve slides in a pressure tight fit within the bore of case 216, above a valve stop 275.

The radial walls of the cylinder have six holes in the radial surface of the cylinder, connecting the inner bore of the cylinder with fluid lines outside the cylinder, as described below. The two holes which are nearest the closed end of the cylinder are equidistant from the end of the cylinder, and line up with channel 279A when main valve 218 is centered. A second set of two holes is similarly located equidistant from the closed end of the cylinder, but is located a predetermined distance below the first set of two holes. The second set of two holes lines up with channel 279C when main valve 218 is centered. The last two holes in case 216 are located such that piston 221 will block both holes when it is in its centered position. The closed end of case 216 also has a hole in it, to accommodate a pressure accumulator fill valve 225. The inside bore of case 216 has an integral raised shoulder near the closed end of the cylinder to limit the upward motion of the main valve. Similarly, integral valve stop 275 limits the downward motion of main valve 218, and acts as a stop to the upward travel of piston 221 as rod 219 retracts into case 216.

The rod 219 is secured to and physically supports piston 221. The rod is preferably a cylindrical solid that slides into and out of case 216 while maintaining a pressure tight seal with the case. The rod preserves a specified spatial relationship between the piston and a wheel support 240. The rod also has a radial passage at the end nearest the piston, which forms the bottom of a pressure equalization passage 234.

The piston 221 slides within the interior bore of cylinder 216, while maintaining a pressure tight fit within the bore of the cylinder. The top edge of the piston blocks fluid flows to a position passage 290A and the bottom edge of the piston simultaneously blocks fluid flows from a position passage 290B when the piston is in its centered position. Fluid is free to flow from the top of piston 221 to the bottom of the piston through pressure equalization passage 234, an axial passage passing through the piston from its top surface to the radial passage in rod 219, which opens to the area below the piston.

The wheel support 240 is secured to the end of rod 219 opposite piston 221, configured to be secured to the wheel assembly and to support the basic embodiment and the load it supports.

A source of pressurized fluid 203 comprising a pressurized hydraulic fluid chamber 285 and a pressure relief reservoir 287 provides the motive force for moving the piston 221 and rod 219.

A fluid relief line 258 fluidly connects the spring cylinder to the fluid reservoir 287.

A pressure feed 259 fluidly connects the pressurized fluid chamber 285 to the spring cylinder.

A main valve spring 272 is disposed between the closed end of the case 216 and the main valve 218. The main valve spring is preferably a helical compression spring. The maximum length of the spring is equal to the distance from the inside of the closed end of case 216 to the top of the main valve when the main valve is centered relative to the fluid relief line 258 and pressure feed 259. The spring provides a minimal amount of pressure when the main valve has moved from its centered position toward the closed end of case 216.

A pressure accumulator 284 is defined by the portion of the cylinder inner bore between the cylinder closed end and the top of the main valve 218. The pressure accumulator 284 is filled with a compressible gas. The pressure accumulator 284, the main valve spring 272 and the main valve 218 collectively function as a load sensor 265 to provide information about the load carried by the frame 217.

An electric position valve control 292 is an electric switching device to control an electric position valve 294A and an electric position valve 294B. The position valve control opens and closes the electric position valves 294A and 294B.

The electric position valve 294A allows fluid flows within position passage 290A only if main valve 218 is centered.

Similarly, the electric position valve 294B allows fluid flows within position passage 290B only if main valve 218 is centered.

The position valve control 292, position valves 294A, 294B, and the fluid passages 290A and 290B function as a controller, moderating the fluid flows between the source of pressurized fluid 203 and the spring cylinder 255.

In operation, the frame member 217 transfers the dynamic loading to the case 216. The load compresses fluid in the pressure accumulator 284, pressing the main valve 218 down to pressurize fluid above the piston 221, which transfers the load to the rod 219 and the wheel support 240. The valve stop 275 limits the downward travel of main valve 218. The main valve spring 272 and pressurized fluid in pressure accumulator 284 hold the passage 274 and the channel 279B in main valve 218 centered between the pressure feed 259 and the fluid relief line 258 against upward pressure exerted by rod 219 and piston 221 through the fluid above the piston 221. Pressure feed 259 aligns with a channel 279C when main valve 218 is in such a centered position, allowing pressurized fluid access to the electric valve control 292 and position passage 290A. Fluid relief line 258 and position passage 290B are attached to the fluid reservoir 287, and similarly align with channel 279A when main valve 218 is centered, allowing pressurized fluid to escape from passage 290A and electric valve control 292. The pressure equalization passage 234 equalizes fluid pressures above and below piston 221. The top edge of piston 221 closes position passage 290A and the bottom edge of piston 221 closes position passage 290B as piston 221 is centered in spring cylinder 255. The pressure accumulator 284 is initially charged with a gas through a pressure accumulator fill valve 225.

Electric position valves 294A and 294B are operated by the electric position valve control 292, which opens position valve 294A and position valve 294B only if passage 274 is sealed between pressure feed 259 and fluid relief line 258. Position valve control 292 thereby ensures fluid in position passage 290B will not be admitted from pressure feed 259 while fluid is being released from fluid relief line 258 through passage 274, and that fluid in position passage 290A will not be released from fluid relief line 258 while fluid is being admitted from pressure feed 259 through passage 274.

The operation of the basic embodiment ensures the first priority of the valving associated with spring cylinder 255 is to ensure the pressure of the fluid in pressure accumulator 284 nearly matches the pressure of fluid above piston 221 by either admitting or releasing fluid through passage 274 and channel 279B. The second priority of the valving is to return piston 221 and rod 219 to a centered position after each such pressure adjustment, by the admission of fluid through channel 279C to position passage 290B or the release of fluid from position passage 290A to channel 279A.

When the pressure of the fluid above piston 221 is equal to the pressure in pressure accumulator 284, the support given to the dynamic load is equal to the magnitude of the dynamic load. Passage 274 and channel 279B are therefor centered between fluid relief line 258 and pressure feed 259, and position valve control 292 opens both position valve 294A and position valve 294B. Piston 221 will block either position passage 290A or position passage 290B if it is off center, and the position passage which is open will either admit or release fluid—until piston 221 becomes centered and seals both position passages. Fluid movement through pressure equalization passage 234 facilitates the movement of piston 221.

Increasing the magnitude of the dynamic load on frame member 217 compresses the fluid in pressure accumulator 284, which is sealed between main valve 218 and pressure accumulator fill valve 225. The additional pressure is passed through main valve 218, pressurizing fluid above piston 221. Main valve 218 may be displaced downward as far as valve stop 275 by such additional pressure, but will admit additional pressurized fluid from pressure feed 259 to channel 279B and passage 274 to ensure the pressure of the fluid internal to spring cylinder 255 equalizes with that of pressure accumulator 284. The additional dynamic loading is thence passed through piston 221 and rod 219 to wheel support 240. Reducing the magnitude of the dynamic load similarly results in reduction of the pressures within pressure accumulator 284 and above piston 221, resulting in a reduction of support which is proportional to the decrease in the dynamic loading. Modifications in the magnitude of the dynamic load are passed on to wheel support 240 with very little compression or expansion of spring cylinder 255; the amount of support given to the dynamic load will therefore match the magnitude of the dynamic load at each moment.

Conversely, a bump (a sudden increase in upward force) displaces wheel support 240 upward, causing a sudden increase in the fluid pressure above piston 221. This pressure increase displaces main valve 218 upward against the pressurized fluid in pressure accumulator 284 and against main valve spring 272. Passage 274 will therefor align with fluid relief line 258, allowing fluid to escape from spring cylinder 255. Rod 219 will retract into case 216 as fluid is released, allowing the wheel to track up over the bump—without raising the dynamic load—while maintaining support equal to the magnitude of the dynamic load. Once the wheel crests the bump, the pressure of the fluid above piston 221 will drop, allowing the pressurized fluid in pressure accumulator 284 to push main valve 218 down, aligning passage 274 with pressure feed 259. The admission of fluid through passage 274 will cause rod 219 to extend, allowing the wheel to track down the back of the bump—without lowering the dynamic load—while maintaining support equal to the magnitude of the dynamic load.

The third embodiment dynamic load-compensating fluid spring 300 is similar to the second embodiment, except that a second rod 319B/piston 321B combination has been added within the pressure accumulator. The frame 317 and its associated load is connected to the rod 319B instead of directly to the case 316.

The third embodiment dynamic load-compensating fluid spring comprising a case 316, consisting of a hollow cylindrical pressure vessel, having two open ends and having an accumulator partition 381 integrated in the case, near the upper end. The radial walls of the cylinder have six holes in the radial surface of the cylinder, connecting the inner bore of the cylinder with fluid lines outside the cylinder, as described below. The two holes which are nearest the accumulator partition are equidistant from the end of the cylinder, and line up with a channel 379A when a main valve 318 is centered. A second set of two holes is similarly located equidistant from the accumulator partition, but is located a predetermined distance below the first set of two holes. The second set of two holes lines up with a channel 379C when main valve 318 is centered. The last two holes in case 316 are located such that a piston 321A will block both holes when it is in its centered position. The inside bore of case 316 has an integral raised shoulder above the accumulator partition to limit the extension of a rod 319B from case 316, and similarly a valve stop 375 limits the downward motion of main valve 318, as well as limiting the upward motion of piston 321A. Accumulator partition 381 limits the retraction of rod 319B into case 316, and also limits the downward travel of main valve 318.

A rod 319A extends from the lower open end of the case 316 and is connected to piston 321A slidably received within the case. The rod 319A is secured to and physically supports piston 321A. The rod 319A is a cylindrical solid which slides into and out of case 316 while maintaining a pressure tight seal therewith. The rod 319A preserves a specified spatial relationship between the piston and a wheel support 340. The rod also has a radial passage at the end nearest the piston, which forms the bottom of a pressure equalization passage 334. The piston 321A slides within the lower section of the interior bore of cylinder 316, while maintaining a pressure tight fit within the bore of the cylinder. The top edge of the piston blocks fluid flows to a position passage 390A and the bottom edge of the piston simultaneously blocks fluid flows from a position passage 390B when the piston is in its centered position. Fluid is free to flow from the top of piston 321A to the bottom of the piston through pressure equalization passage 334, an axial passage passing through the piston from its top surface to a radial passage in rod 319A, which opens to the area below the piston.

The main valve 318 consists of a solid cylindrical body having two channels routed around its radial surface; channel 379A is routed above a passage 374, and channel 379C is routed below passage 374. Passage 374 extends upward from the bottom surface of the main valve to the upper surface of the main valve. Additionally, passage 374 extends radially to the radial surface of main valve 318 at the central transverse plane. A main valve stem 377 is an integral part of the main valve, and extends upward from the upper surface of the main valve through a pressure tight opening in accumulator partition 381. The main valve stem is not centered on the upper surface of the main valve to prevent the rotation of the main valve within the inner bore of case 316. The main valve slides in a pressure tight fit within the bore of case 316, above valve stop 375.

The rod 319B is secured to and is physically supported by a piston 321B. The rod is a cylindrical solid which slides through a pressure tight opening in the end of case 316 nearest the accumulator partition. The rod has a small, axial passage which passes from its upper surface to the bottom surface of piston 321B. The upper end of the small, axial passage terminates at a pressure accumulator fill valve 325. The upper end of the rod is reduced in diameter, creating a shoulder on which a frame member 317 is secured. The rod and piston have a passage immediately adjacent to the small, axial passage which extends upward a predetermined distance from the bottom surface of the piston to accommodate vertical motion of main valve stem 377. A radial passage extends outward from the small, axial passage (and the passage immediately adjacent to it) to the outer radial surface of rod 319B.

The piston 321B slides within the interior bore of cylinder 316 above the accumulator partition, while maintaining a pressure tight fit within the bore of the cylinder. The piston has a passage extending upward from its lower surface to its upper surface, to accommodate the movement of main valve stem 377, the movement of compressed gas above and below the piston, and the admission or release of compressed gas through the small, axial passage.

The wheel support 340, secured to the end of rod 319A opposite piston 321A, is configured to be secured to the wheel assembly and to support the enhanced embodiment and the load it supports.

A source of pressurized fluid 303 comprising a pressurized hydraulic fluid chamber 385 and a pressure relief reservoir 387 provides the motive force for moving the piston 321A and support 319A.

A fluid relief line 358 fluidly connects the spring cylinder to the fluid reservoir 387.

A pressure feed 359 fluidly connects the source of pressurized fluid 385 to a spring cylinder 355.

A main valve spring 372 is disposed between the accumulator portion 381 and the main valve 318 and is preferably a helical compression spring. The main valve spring 372 has a maximum length that is equal to the distance from the lower surface of accumulator partition 381 to the top of the main valve when the main valve is centered. The spring provides a minimal amount of pressure when the main valve has moved from its centered position toward the accumulator partition.

A pressure accumulator 384 is defined by the portion of the spring cylinder inner bore which is above the accumulator partition 381, inclusive of the axial and radial passages in the rod 319B and the piston 321B, but exclusive of the rod 319B, exclusive of the piston 321B, and exclusive of the main valve stem 377. The pressure accumulator is filled with a compressible gas.

An electric position valve control 392 is an electric switching device to control an electric position valve 394A and an electric position valve 394B. The position valve control opens and closes the electric position valves 394A and 394B.

The electric position valve 394A allows fluid flows within position passage 390A only if main valve 318 is centered.

Similarly, the electric position valve 394B allows fluid flows within position passage 390B only if main valve 318 is centered.

The position valve control 392, position valves 394A, 394B, and the fluid passages 390A and 390B function as a controller, moderating the fluid flows between the source of pressurized fluid 303 and the spring cylinder 355.

Main valve 318 has been modified somewhat from main valve 218 (FIG. 2) to permit it to respond more quickly to pressure imbalances between the fluid above piston 321A and the fluid in pressure accumulator 384, as described below.

Pressure accumulator 384 is charged through pressure accumulator fill valve 325. The frame member 317 transfers dynamic loading to rod 319B and piston 321B. The rod 319B compresses a gas in a pressure accumulator 384; the compressed gas pushes down main valve stem 377. Main valve stem 377 widens to form the body of main valve 318 after it passes down through accumulator partition 381 in case 316. Main valve spring 372 pushes main valve 318 down (together with main valve stem 377) against the pressurized fluid above piston 321A. The pressurized fluid above piston 321A is admitted through passage 374 in main valve 318, pressurizing the void around main valve spring 372.

Figure 3:
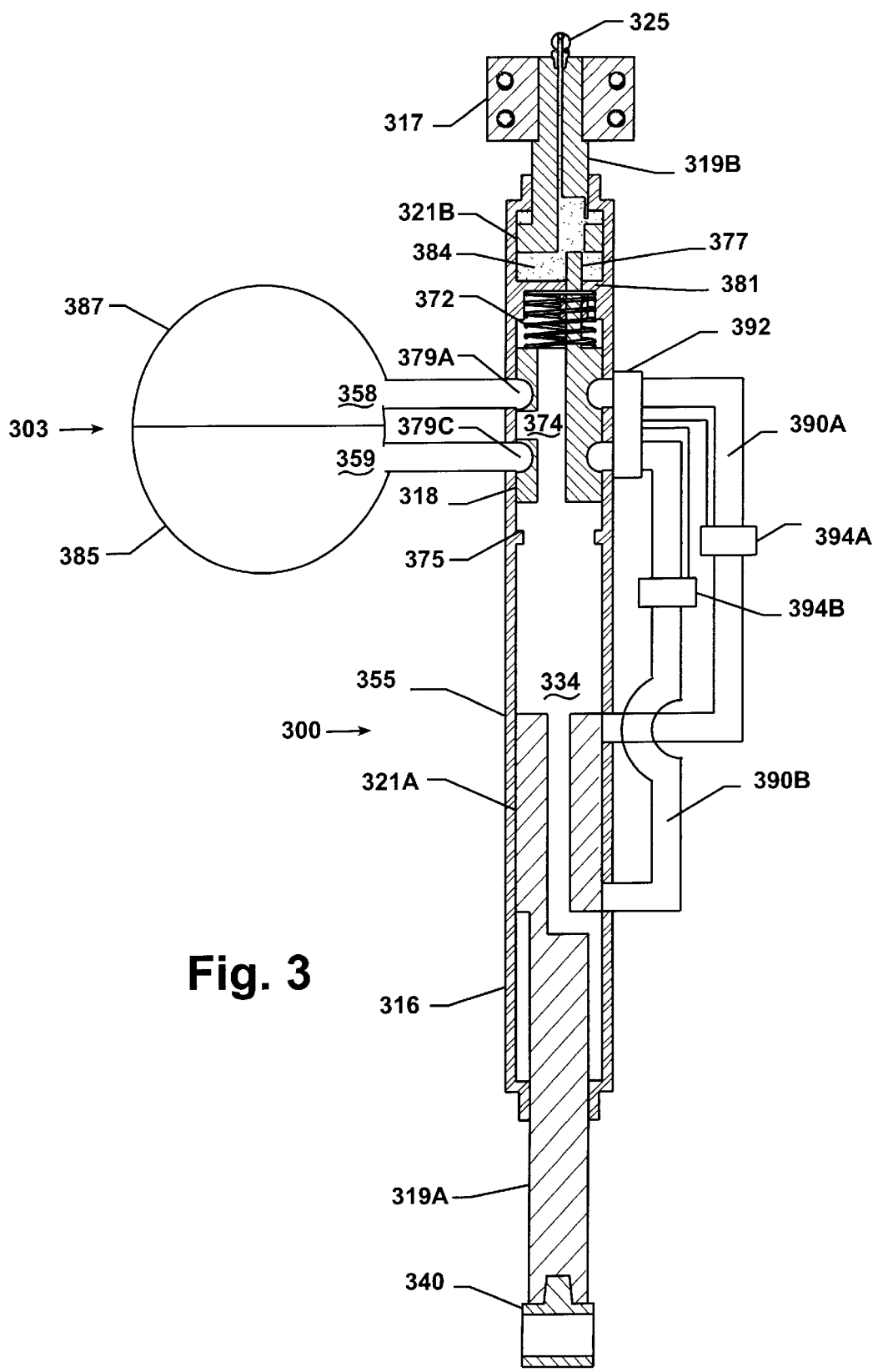
FIG. 3 illustrates a third of the dynamic load-compensating spring comprising a single cylinder which adjusts its length and/or internal pressure more quickly than that shown in FIG. 2. It also passes less shock or vibration on to the dynamic load it supports.

The operation of the fluid spring shown in FIG. 3 is identical to that of the fluid spring shown in FIG. 2, with the following exceptions. The dynamic load is secured to the frame member 317, and loads rod 319B and piston 321B. The loaded rod charges pressure accumulator 384, which pushes down on main valve stem 377 and main valve 318. The downward pressure on main valve 318 is resisted by pressurized fluid above piston 321A acting on an area of the bottom of main valve 318 equal to the surface area of the top of main valve stem 377. Main valve 318 thus continues to act to equalize the pressure of the fluid in pressure accumulator 384 with the pressure of the fluid above piston 321A. Any modifications in the magnitude of the dynamic load are passed on to piston 321A, to rod 319A, and finally to wheel support 340. Very little compression or expansion of spring cylinder 355 results from rapid or slow modifications in the dynamic loading, and the amount of support given to the dynamic load matches the magnitude of the dynamic load at each moment.

Conversely, a bump (a sudden increase in upward force) displaces wheel support 340 upward, causing a sudden increase in the pressure above piston 321A. This pressure increase displaces main valve 318 upward against the pressurized fluid in pressure accumulator 384 and against main valve spring 372. Passage 374 will therefore align with fluid relief line 358, allowing fluid to escape through passage 374 to fluid relief line 358.

The displacement of main valve 318 is much more rapid, however, as the ratio of the retraction of rod 319A into case 316 to the expulsion of main valve stem 377 through accumulator partition 381 is inversely proportional to the ratio of the squares of their respective diameters. For example, if rod 319A is 16 mm in diameter and main valve stem 377 is 4 mm in diameter, a 1 mm retraction of rod 319A into case 316 will cause main valve stem 377 to move 16 mm upward within case 316. The use of main valve stem 377 also facilitates the movement of main valve 318, as the compression of fluid within pressure accumulator 384 is minimized. Further, minimizing such fluid compression minimizes the shock transmitted through pressure accumulator 384 to frame member 317 and to the dynamic load.

Last, no middle channel (corresponding to channel 279B in FIG. 2) is necessary in FIG. 3, as main valve 318 is prevented from rotating in case 316 by the extension of main valve stem 377 through an off center hole in accumulator partition 381. Passage 374 therefore opens directly to the radial surface of main valve 318.

Figure 4:
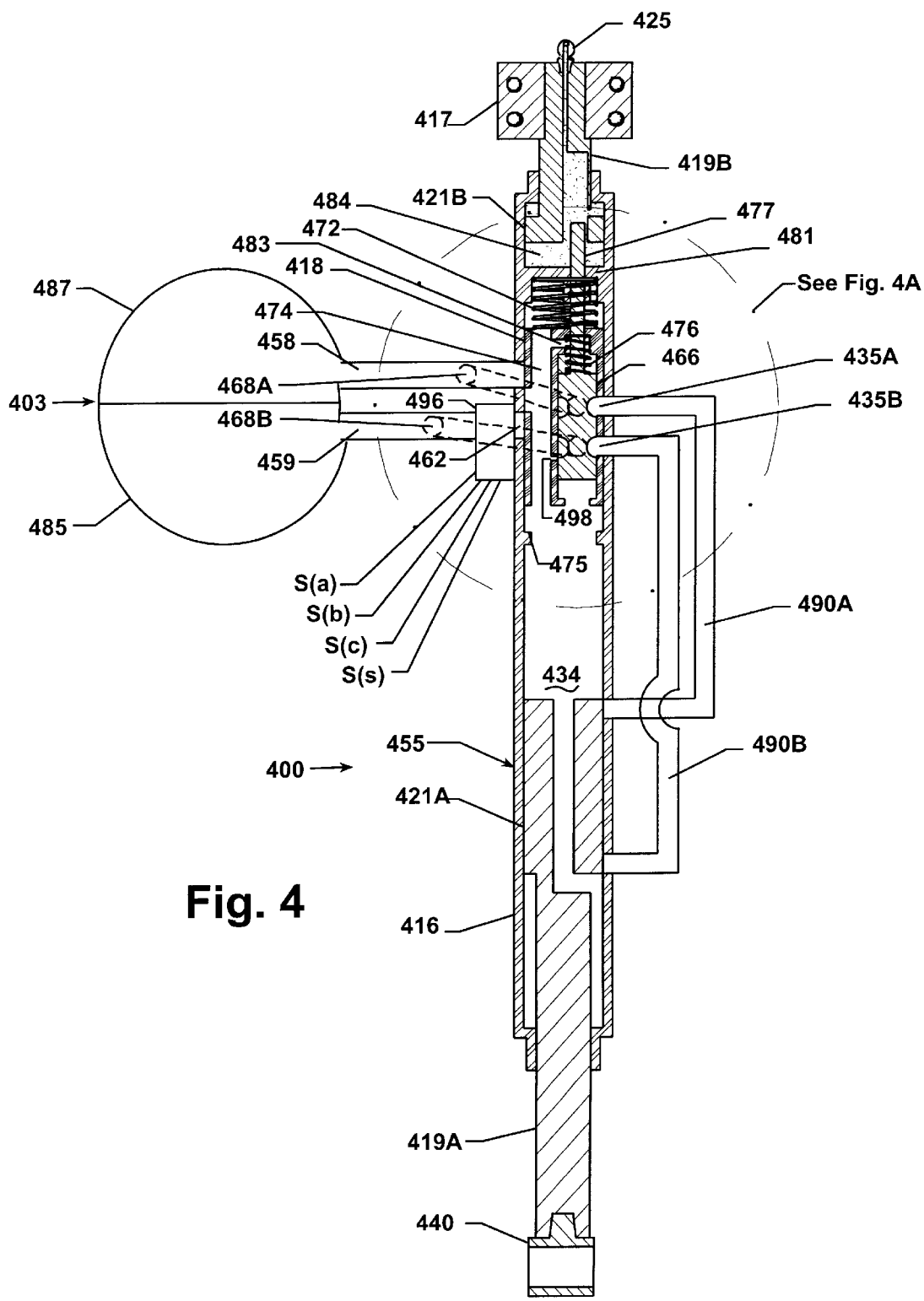
FIG. 4 depicts a fourth embodiment of the dynamic load-compensating spring single cylinder having an array of sensors to regulate the extension of the cylinder.
Figure 4A:
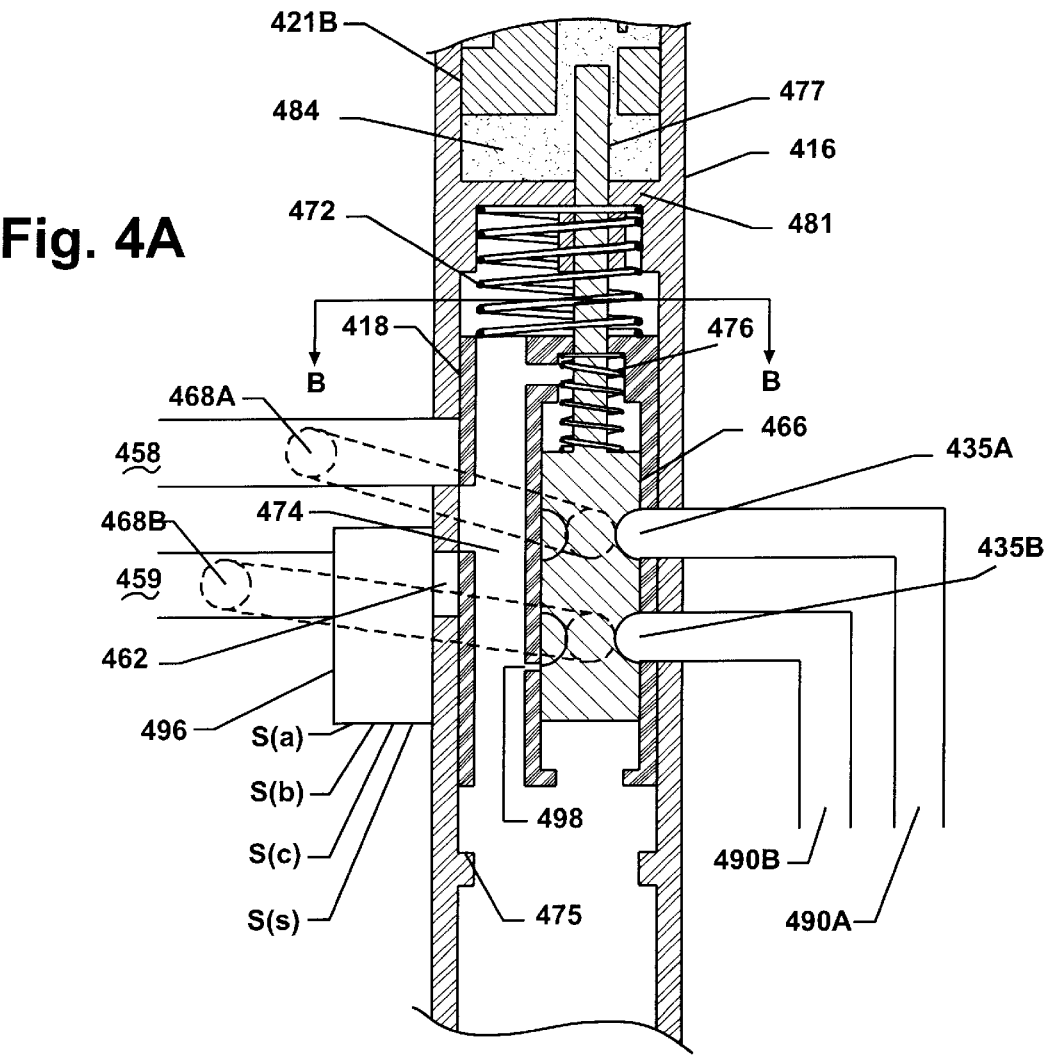
FIG. 4A is an enlarged view of a valve portion of FIG. 4.
Figure 4B:
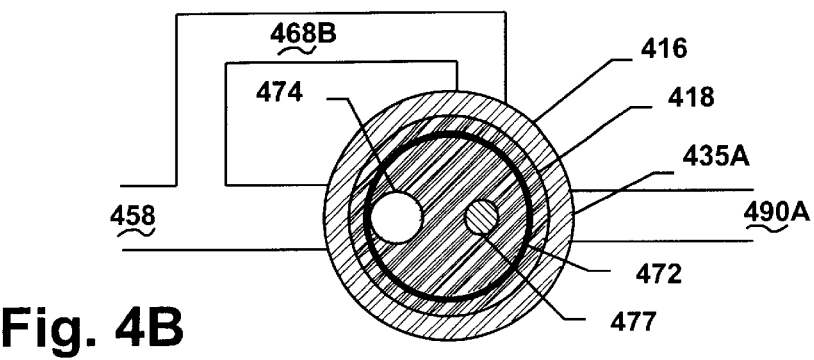
FIG. 4B is a sectional view through line 4B—4B.

FIG. 4 illustrates a fourth embodiment dynamic load-compensating fluid spring 400 that is substantially similar to the third embodiment dynamic load-compensating fluid spring 300, except that a poppet valve 466 has been added to a main valve 418 for better response to high frequency vibrations. The fourth embodiment also includes a variably restricted pressure feed 462 that is sensor controlled to regulate the extension of the fourth embodiment into holes, predicated on the operational conditions of the vehicle.

The fourth embodiment comprises a spring cylinder 455 that connects a dynamic load (vehicle) through a frame member 417 to the ground via a wheel assembly mounted to a wheel mount 440.

The spring cylinder 455 comprises a case 416 consisting of a hollow cylindrical pressure vessel, having two open ends. An accumulator partition 481 is integrated in the case 416, near the upper end. The cylinder has eight holes in its radial surface, connecting the inner bore of the cylinder with fluid lines outside the cylinder, as described below. One hole is connected with a fluid relief line 458. A second hole, variably restricted pressure feed 462, is connected to a pressure feed 459 through an electric valve 496. These two holes are above and below a passage 474 in main valve 418, respectively, when the main valve 418 is centered.

A set of two additional holes is equidistant from accumulator partition 481; one of these holes is connected to the upper end of a position passage 490A, while the other is connected to a fluid relief line bypass 468A. An additional set of two holes is also equidistant from accumulator partition 481; one of these holes is connected to the upper end of a position passage 490B, while the other is connected to a pressure feed bypass 468B. The last two holes in case 416 are located such that a piston 421A will block both holes when it is in its centered position. These holes fluidly connect the passages 490A and 490B to the inner bore of the case 416. Movement of the piston 421A away from the centered position will open one of the holes and its corresponding fluid passage either admitting or releasing pressurized fluid from case 416 and causing the piston to re-center itself.

The inside bore of case 416 has an integral raised shoulder above the accumulator partition to limit the extension of a rod 419B from case 416. A valve stop 475 which is also integral to the inside bore of case 416 limits the downward motion of main valve 418, and limits the upward motion of piston 421A. Accumulator partition 481 limits the retraction of rod 419B into case 416, and also limits the downward travel of main valve 418.

The frame member 417 is secured to rod 419B and is suitably attached to the dynamic load which is to be supported.

The main valve 418 preferably consists of a solid cylindrical body having multiple flow passages therethrough that a first vertical passage 474 extends upward from the bottom surface of the main valve to the upper surface of the main valve. Additionally, passage 474 extends radially to the radial surface of main valve 418 at the central transverse plane. A second vertical passage is provided within the main valve 418 and allows the vertical motion of poppet valve 466 within the main valve 418. The second passage also extends upward from the bottom surface of the main valve 418 to the upper surface of the main valve 418. Shoulders are located at the top and bottom of the second passage and are designed to limit the motion of the poppet valve therein. The second passage narrows at the upper shoulder to limit the upward motion of the poppet valve and to permit the installation of a poppet valve spring 476. The second passage further narrows again above the top of the poppet valve spring 476 to form a pressure tight opening which permits the vertical motion of a poppet valve stem 477, which extends through the second vertical passage.

Two lateral passages open between the vertical passages; a valve control port 498 is horizontally aligned just below passage 490B when passage 474 is centered between variably restricted pressure feed 462 and fluid relief line 458. A second lateral passage 483 permits fluid flows between the area occupied by the upper end of poppet valve spring 476 and passage 474.

A set of two holes in main valve 418 is equidistant from the top surface of main valve 418. One of these holes (a position control port 435A) is opposite the hole in case 416 connected to the upper end of position passage 490A, while the other hole is opposite the hole in case 416 connected to fluid relief line bypass 468A when the main valve is centered.

A second set of two holes is also equidistant from the top surface of main valve 418; one of these holes (a position control port 435B) is opposite the hole in case 416 connected to the upper end of position passage 490B, while the other is opposite the hole in case 416 connected to fluid relief line bypass 468A when the main valve is centered.

A rod 419A is secured to and physically supports piston 421A. The rod is a cylindrical solid which slides into and out of case 416 while maintaining a pressure tight seal with the case. The rod preserves a specified spatial relationship between the piston and wheel support 440. The rod also has a radial passage at the end nearest the piston, which forms the bottom of a pressure equalization passage 434.

The piston 421A slides within the lower section of the interior bore of cylinder 416, while maintaining a pressure tight fit within the bore of the cylinder. The top edge of the piston blocks fluid flows to position passage 490A and the bottom edge of the piston simultaneously blocks fluid flows from position passage 490B when the piston is in its centered position. Fluid is free to flow from the top of piston 421A to the bottom of the piston through pressure equalization passage 434, an axial passage passing through the piston from its top surface to a radial passage in rod 419A, which opens to the area below the piston.

The rod 419B is secured to and is physically supported by a piston 421B. The rod is a cylindrical solid which slides through a pressure tight opening in the end of case 416 nearest the accumulator partition 481. The rod 419B has a small axial passage which passes from its upper surface to the bottom surface of piston 421B. The upper end of the small axial passage terminates at a pressure accumulator fill valve 425. The upper end of the rod 419B is reduced in diameter, creating a shoulder on which frame member 417 is secured. The rod 419B and piston 421B have a passage immediately adjacent to the small axial passage which extends upward a predetermined distance from the bottom surface of the piston to accommodate vertical motion of poppet valve stem 477. A radial passage extends outward from the small axial passage (and the passage immediately adjacent to it) to the outer radial surface of rod 419B.

The piston 421B slides within the interior bore of cylinder 416 above the accumulator partition, while maintaining a pressure tight fit within the bore of the cylinder. The piston has a passage extending upward from its lower surface to its upper surface, to accommodate the movement of poppet valve stem 477, the movement of compressed gas above and below the piston, and the movement of compressed gas through the small, axial passage.

The wheel support 440, secured to the end of rod 419A opposite piston 421A, is configured to be secured to the wheel assembly and to support the enhanced embodiment and the load it supports.

A source of pressurized fluid 403 comprises a pressurized fluid chamber 485 and a fluid reservoir 487, which together provide the motive force for moving the piston 421A and rod 419A.

Fluid relief line 458 forms a conduit from the spring cylinder 455 to the fluid reservoir 487.

A pressure feed 459 forms a conduit from the pressurized hydraulic fluid chamber 485 to the spring cylinder 455.

The poppet valve 466 is preferably a solid cylinder having two annular passages routed around its radial surface. The two passages align with position control port 435A and position control port 435B when the poppet valve is centered. The cylindrical poppet valve stem 477 extends axially upward from the main body of the poppet valve as an integral part of the poppet valve. The poppet valve stem 477 is able to slide vertically through a pressure tight opening in the accumulator partition.

A fluid relief line bypass 468A provides a conduit from the main valve vertical passage containing the poppet valve to fluid relief line 458.

Similarly, the pressure feed bypass 468B provides a conduit from the main valve vertical passage containing the poppet valve to the pressure feed 459.

The poppet valve spring 476 is preferably a helical compression spring. The spring provides a minimal resistance to motion of the poppet valve upward from its centered position. The poppet valve spring should collapse completely before a main valve spring 472 begins to compress in this embodiment.

Main valve spring 472 is preferably a helical compression spring. The maximum length of the spring is equal to the distance from the lower surface of accumulator partition 481 to the top of the main valve when the main valve is centered. The spring provides a minimal amount of pressure when the main valve has moved from its centered position toward the accumulator partition.

A pressure accumulator 484 is defined by the portion of the spring cylinder inner bore which is above the accumulator partition 481, inclusive of the axial and radial passages in the rod 419B and the piston 421B, but exclusive of the rod 419B, exclusive of the piston 421B, and exclusive of the poppet valve stem 477. The pressure accumulator is filled with a compressible gas.

The electric valve 496 fluidly connects the pressure feed line 459 to the cylinder inner bore through variably restricted pressure feed 462. The electric valve 496 permits or variably restricts fluid flows from pressure feed 459 to variably restricted pressure feed 462 based on input from a variety of sensors.

Operation of the fourth embodiment dynamic load-compensating fluid spring 400 improves over the third embodiment by the addition of poppet valve 466 within the main valve 418 to further quicken its motion and prioritize fluid flows by splitting the pressure feed bypass 468B from a pressure feed 459 and fluid relief line bypass 468A from fluid relief line 458. The pressure feed bypass allows electric valve 496 and related sensors to control the extension of spring cylinder 455 by regulating the admission of pressurized fluid through variably restricted pressure feed 462, as described below.

The passage 474 within main valve 418 is held centered between pressure feed 459 and fluid relief line 458 if the combined downward pressure of poppet valve spring 476 and pressure accumulator 484 acting on a poppet valve stem 477 is balanced by the upward force exerted by pressurized fluid above piston 421A acting on an area of the bottom of poppet valve 466 equal to the surface area of the top of poppet valve stem 477. Pressure feed 459 is attached to a source of pressurized fluid 485, and fluid relief line 458 is attached to a fluid reservoir 487.

Fluid can leave spring cylinder 455 from a position passage 490A if piston 421A is below passage 490A when the fluid pressure above piston 421A is equal to the pressure internal to pressure accumulator 484. The fluid then passes from passage 490A to position control port 435A and to the channel routed around the circumference of poppet valve 466. The fluid is then released from the channel to fluid relief bypass 468A through corresponding holes in main valve 418 and case 416 if main valve 418 and poppet valve 466 are centered. Similarly, fluid can be admitted to spring cylinder 455 from pressure feed bypass 468B through a position control port 435B, which receives fluid from a channel routed around the circumference of poppet valve 466 if main valve 418 and poppet valve 466 are centered. The admission of fluid is further conditioned on piston 421A being above a passage 490B, allowing fluid movement to continue through passage 490B from position control port 435B, into the area below piston 421A.

The main valve spring 472 begins to compress after poppet valve spring 476 has been compressed by upward motion of poppet valve 466. Valve control port 498 allows fluid entry to passage 474 from pressure feed bypass 468A through a channel routed around the outer perimeter of poppet valve 466 if the poppet valve has dropped below a centered position within main valve 418. This additional fluid marginally increases pressure below the poppet valve, returning the poppet valve to a centered position.

Referring to FIGS. 3 and 4, note that main valve spring 372 in FIG. 3 has been redrawn and renumbered as 472 in FIG. 4. All components physically drawn above main valve spring 372 in FIG. 3 have been redrawn and renumbered as 4*xx*, and all have the same function as their counterpart in FIG. 3. Additionally, all components physically drawn below main valve 318 in FIG. 3 have been redrawn and renumbered as 4*xx*, and all have the same function as their counterpart in FIG. 3. Therefore, these parts will not be reintroduced here.

The operation of the fluid spring shown in FIG. 4 is generally identical to that of the fluid spring shown in FIG. 3, except that any increase in the dynamic load pressurizes the gas in the pressure accumulator 484, initially acts on the poppet valve 466 in concert with the poppet valve spring 476 to press down on poppet valve 466. The downward force is resisted by upward force from pressurized fluid above piston 421A acting on an area of the bottom of poppet valve 466 equal to the surface area of the top of poppet valve stem 477. Poppet valve 466 thus acts to equalize the pressure of the fluid in pressure accumulator 484 with the pressure of the fluid above piston 421A. The movement of the poppet valve minimizes the movement of fluid and the amount of mass being moved within spring cylinder 455, and also minimizes the pressure variation in pressure accumulator 484 while the fluid spring is absorbing a bump.

If the fluid pressure change is great enough that the poppet valve 466 reaches the end of its stroke, the poppet valve 466 will displace the main valve 418 up against the main valve spring 472 or down toward valve stop 475, releasing or admitting fluid through passage 474, respectively. The release or admission of fluid to spring cylinder 455 equalizes the pressures at either end of poppet valve 466 and causes the poppet valve to return to a centered position. Any changes in the magnitude of the dynamic load are passed on to piston 421A, to rod 419A, and finally to wheel support 440 in this manner. If the poppet valve begins to settle from its centered position within the main valve for any reason, pressurized fluid will enter passage 474 through valve control port 498 from pressure feed bypass 468B, incrementally increasing the pressure above piston 421A and raising the poppet valve to its centered position.

The poppet valve 466 prioritizes the admission and release of fluid from spring cylinder 455 without the need for high speed position valves (394A and 394B as shown in FIG. 3) or their associated position valve control 392 (FIG. 3). Any initial vertical movement of wheel support 440 (and hence movement of rod 419A and piston 421A) relative to the dynamic load will initially be compensated by rapid vertical movement of poppet valve 466, closing off any fluid movement in position passages 490A and 490B. This closure will occur prior to fluid being admitted or released from passage 474 which may be necessary to adjust fluid pressure below poppet valve 466 to match those above poppet valve stem 477. Once the fluid pressures have been equalized, poppet valve 466 returns to a centered position within main valve 418, closing off further fluid flows through passage 474 and allowing fluid to resume through position control port 435A to position passage 490A or through position control port 435B to position passage 490B, returning piston 421A to a centered position.

The separation of fluid relief line 458 and pressure feed 459 into fluid relief line bypass 468A and pressure feed bypass 468B (respectively) also allows the conditional extension or retraction of spring cylinder 455. Electric valve 496 limits the fluid flow from pressure feed 459 to spring cylinder 455 through variably restricted pressure feed 462 in accordance with inputs from acceleration, braking, cornering, and speed sensors, in the following manner:

If the vehicle is stopped (with a wheel over a depression), the pressure of the fluid above piston 421A will drop and the pressurized fluid in pressure accumulator 484 will force poppet valve 466 and main valve 418 to drop to their lowest positions, opening passage 474 to pressure feed 459. The speed sensor will dictate that valve 496 is open, allowing fluid to enter spring cylinder 455 through variably restricted pressure feed 462, causing wheel support 440 to extend into the depression.

If the vehicle is moving at medium to high speeds (in a relatively straight line with minimal acceleration or braking), and the wheel passes over a depression, pressure accumulator 484 will similarly force poppet valve 466 and main valve 418 to drop, opening passage 474 to pressure feed 459. The respective sensors will close valve 496, preventing spring cylinder 455 from extending and tracking through the depression. The wheel will be 'carried' across the depression and will resume travel on the far side without effect.

If the vehicle is moving at low speeds, or is maneuvering (accelerating, braking, or cornering), and the wheel passes over a depression, the respective sensors can partially restrict fluid flows through valve 496, allowing the wheel to track through the depression, providing additional stability in accordance with predetermined design criteria.

Note that the sensors indicated above may vary predicated on the design criteria; for instance, a part time four-wheel drive vehicle may include a sensor reflecting whether a particular wheel is engaged to the transmission. The desired operational characteristics of the fluid spring may necessitate a similar valve between fluid relief line 458 and case 416 (together with appropriate sensors) to allow control of the retraction of rod 419B into case 416.

FIG. 2 established a basic embodiment for a fluid spring which was enhanced in FIG. 3, and further enhanced in FIG. 4. The description and operation of the preferred embodiment is not well suited to a further embellishment of the previous embodiments, however. The numbering of the parts in the preferred embodiment is consistent with the numbering of the parts in the proceeding figures, but (sadly) the description and operation of the preferred embodiment which follows begins anew.

Figure 10:
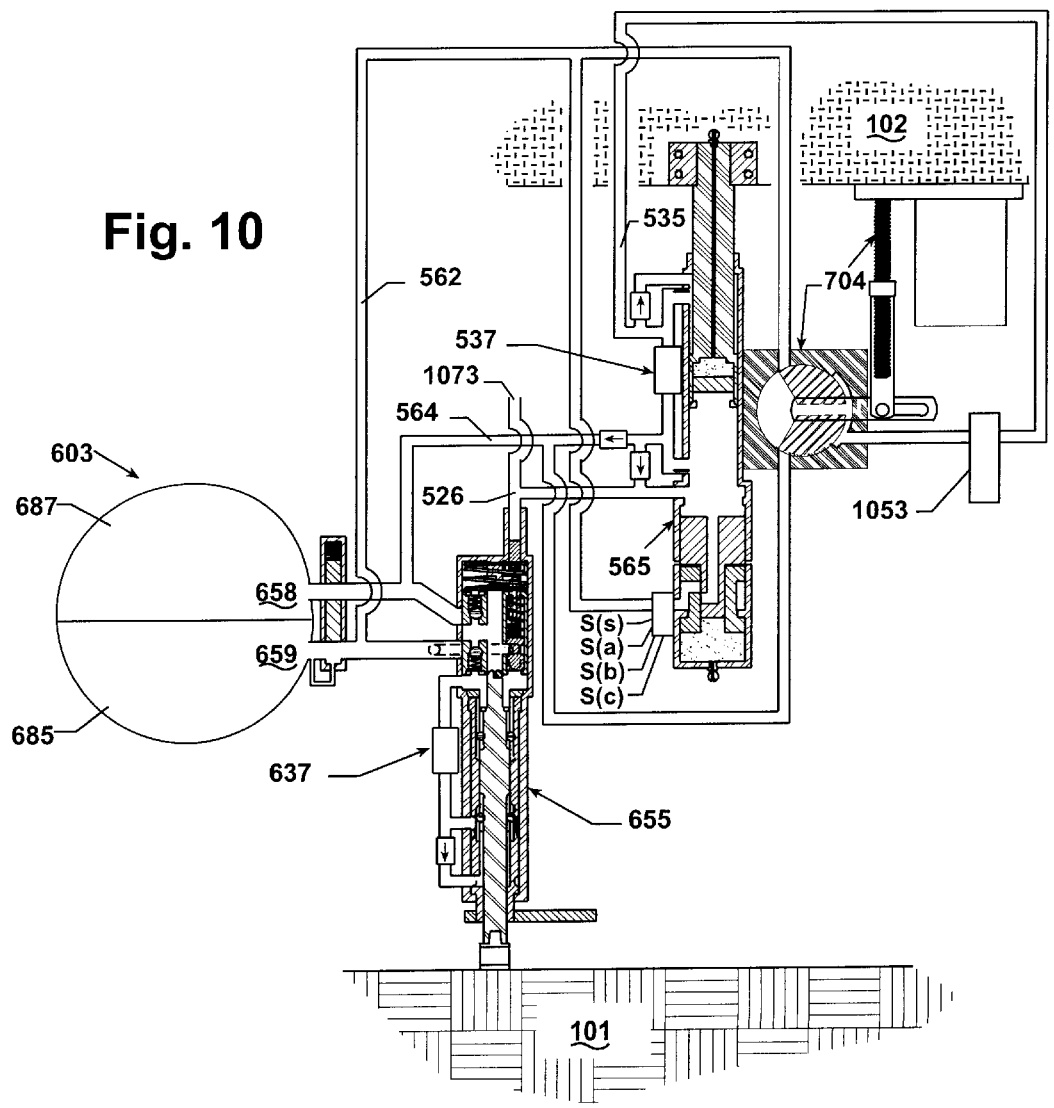
FIG. 10 illustrates an overall assembly of FIGS. 5–7 of the dynamic load-compensating fluid spring and related fluid interconnections between the components.

FIGS. 5–10 illustrate a fifth embodiment of the dynamic load-compensating fluid spring 655 (FIG. 6) in combination with a lift cylinder 565 (FIG. 5). The lift cylinder 565 adjusts the relative position of the dynamic load 102 (FIG. 10) relative to the foundation 101 (FIG. 10). A position valve 704 (FIG. 7) is provided to control the lift cylinder 565. In addition to height adjustment, the lift cylinder 565 performs the sensor function of sending a spring cylinder 655 an input indicative of the change in the dynamic load. The spring cylinder 655 uses this input to control the dynamic load relative to the foundation.

The lift cylinder 565 comprises a case 516 consisting of a hollow cylindrical pressure vessel having one closed end and one open end. The diameter of the cylinder is greatest at the closed end; this large diameter section extends upward to just beyond a passage 529, where its diameter reduces to form a pressure tight bore for a piston 521. The diameter of the cylinder is additionally reduced beyond a passage 531, forming a pressure tight opening which permits a rod 519 to slide into and out of the cylinder.

The case has seven holes in its radial surface; two holes (a soft stop 520 and a soft stop 530) are connected to either end of a passage 534 and define the limits of travel for piston 521. Two additional holes are fluidly connected to passages 531 and 529, respectively. An additional set of two holes (a soft stop 536) just above the lower edge of a main valve 561 admit air at ambient pressure to the area between a frame stop 567 and main valve 561 if the main valve has been displaced upward by a preload accumulator 524. A final hole 591 in the radial surface of the case is connected to variably restricted pressure feed 562 through an electric valve 596.

The case has one additional hole in the closed end of the case to permit the installation of a pressure accumulator fill valve 525, which facilitates the admission or release of compressible gas into preload accumulator 524.

The internal radial surface of the lower section of the case has two integral steps. One such step is immediately below the hole 591, which connects with variably restricted pressure feed 562 through electric valve 596. This step limits the upward travel of frame stop 567. The other step (a valve stop 575) is immediately below the hole which aligns with passage 529; this step limits the upward movement of main valve 561.

A frame member 517 is secured to a rod 519 and slidably received in the case 516. The frame 517 can be suitably attached to the dynamic load which is to be supported by this embodiment.

The rod 519 slides into and out of case 516 through the pressure tight opening in the end of the case. The rod has a small, axial passage extending from the upper surface of the rod to the bottom surface of the rod, which axial passage further extends into piston 521. This passage terminates at its upper end at pressure accumulator fill valve 525, which facilitates the admission or release of compressible gas into a pressure accumulator 584. The upper end of the rod is reduced in diameter, creating a shoulder on which frame member 517 is secured. The lower end of the rod is attached to piston 521.

The piston fits within a pressure tight bore within case 516, and is able to travel between soft stop 530 and soft stop 520. The piston has a large axial bore which extends upward from the bottom of the piston a predetermined distance; the upper surface of the large axial bore opens to a small axial bore which is contiguous with the small axial bore in rod 519. An accumulator piston 527 slides vertically in the large axial bore, and maintains a pressure tight seal with the large axial bore. The area within piston 521 below the upper surface of the large axial bore and above the accumulator piston is pressure accumulator 584, which contains a compressible gas.

An overload relief valve 522 releases fluid from pressure equalization passage 534 to a fluid relief line 564 if the fluid pressure in the pressure equalization passage 534 exceeds predetermined limits; conventional relief valves may be used for this application.

A pressure accumulator end cap 523 retains the accumulator piston 527 within the bore of the piston 521 and is preferably ring-shaped to facilitate fluid flows into and out of piston 521, while limiting the downward travel of accumulator piston 527.

Preload accumulator 524 contains compressible gas and exerts pressure on the bottom surface of main valve 561 (having a predetermined surface area), causing the main valve to move upward if the fluid pressure below piston 521 drops below a predetermined pressure. The compressible gas also exerts pressure on the bottom surface of frame stop 567. The combined downward force of the main valve 561 and frame stop 567 will compress the preload accumulator in the event of extreme fluid pressure below piston 521.

A pressure regulating passage 526 forms a conduit to communicate the internal pressure of lift cylinder 565 to poppet valve end cap 678 in spring cylinder 655, ensuring the internal pressures of the two cylinders are kept nearly equal.

A soft stop bypass 528 acts as a check valve in allowing the flow of fluid from pressure equalization passage 534 to passage 529 (facilitating the extension of rod 519 from case 516), but which does not permit fluid flow in the opposite direction. Conventional check valves may be used for this application.

A soft stop bypass 532 acts as a check valve in allowing the flow of fluid from pressure equalization passage 534 to passage 530 (facilitating the retraction of rod 519 from case 516), but which does not permit fluid flow in the opposite direction. Conventional check valves may be used for this application.

Pressure equalization passage 534 forms a conduit which permits fluid flow from the area above piston 521 to the area below the piston through lift solenoid 537. This conduit additionally admits or releases fluid from passage 535 to allow control of the extension of rod 519 from case 516, and releases fluid through fluid relief line 564 should the fluid pressure in the pressure equalization passage exceeds predetermined limits.

Lift solenoid assembly 537, which is preferably an electro-hydraulic valve, allows the conversion of lift cylinder 565 from a single acting cylinder to a double acting cylinder. As a single acting cylinder, rod 519 retracts into the cylinder only under the influence of the dynamic load. Its conversion to a double acting cylinder allows the rod to be forced into the cylinder, possibly against resistance from the load. The parts of the lift solenoid are described below.

The lift solenoid includes a passage 538 that forms a conduit allowing fluid from a variably restricted pressure feed 562 to enter the lower end of case 516 through electric valve 596 if main valve 561 is forced upward by preload accumulator 524, aligning a passage 563 with passage 538.

Main valve 561, which is a solid cylindrical body, slides in a pressure tight fit with the lower interior bore of case 516. The bottom of the main valve has a reduced diameter and slides in a pressure tight fit within frame stop 567. Note that the section of the main valve which has a reduced diameter is preferably not axial; off centering the lower section of the main valve 561 will prevent its rotation within the frame stop. The bottom surface of the main valve 561 is in contact with the compressed gas in preload accumulator 524, and the upper surface is in contact with the pressurized fluid internal to lift cylinder 565. The shoulder created by reducing the diameter of the bottom of the main valve 561 abuts the upper surface of frame stop 567. Should preload accumulator 524 displace the main valve 561 upward, the gap between the main valve shoulder and the upper surface of the frame stop 567 will widen, facilitated by the admission of air at ambient pressure through soft stop 536. Similarly, when the downward force generated by fluid pressure above main valve 561 exceeds that of the compressed gas below the bottom surface of main valve 561, the gap will close, discharging air through soft stop 536. As the edge of the shoulder closes soft stop 536, air trapped in the gap will be compressed, cushioning the return of the main valve to its position abutting the frame stop. Passage 563 extends from the upper surface of main valve 561 to within a predetermined distance of the bottom surface of main valve 561, where it turns and extends radially to the radial surface of the lower section of the main valve.

Pressurized fluid is supplied to the frame stop 567, passages 591, 538, and 563 by variably restricted pressure feed 562 which is connected to the pressure feed 659.

Fluid relief line 564 is a conduit from the lift cylinder 565 to fluid relief line 658.

The frame stop 567 is a cylindrical solid that slides in a pressure tight bore in the lower section of case 516. The frame stop has a channel routed around its radial surface at the central transverse plane. The channel facilitates fluid flows from variably restricted pressure feed 562 through electric valve 596 and passage 591 to passage 538, regardless of the angular position of the frame stop within the bore of case 516. The channel has a section which is rectangular in cross section. The surface of the bottom of the channel is normally in contact with a step integral to case 516, immediately below passage 591; this step limits the upward travel of frame stop 567. Frame stop 567 has a passage which extends from its lower surface to its upper surface. This passage allows the reduced diameter lower section of main valve 561 to slide vertically while maintaining a pressure tight relationship with the passage. Passage 538 extends radially through frame stop 567, extending from the inner radial surface of the channel to the inner bore of the frame stop, in radial alignment with passage 563.

The electric valve 596 permits or variably restricts fluid flows through variably restricted pressure feed 562 to the interior of case 516, based on input from a variety of sensors. Depicted in FIG. 5 are sensors which monitor the acceleration, braking, cornering, and speed of the vehicle on which the spring cylinder is mounted and are substantially identical to the sensors described in FIG. 4.

Looking at the spring cylinder in greater detail, the spring cylinder 655 comprises a spring case 616 consisting of a hollow cylindrical pressure vessel having one closed end and one open end. The diameter of the cylinder is greatest at the closed end; this large diameter section extends downward to just beyond the upper end of a pressure equalization passage 634, where its diameter reduces to form a pressure tight bore for a steering sleeve 648. The shoulder created by the reduction of the diameter limits the downward movement of a main valve 618. The interior bore of case 616 is slightly reduced a predetermined distance down from the shoulder, creating a smaller shoulder on which the steering sleeve rests. The diameter of the cylinder is additionally reduced beyond the lower end of pressure equalization passage 634, forming a pressure tight opening which permits steering sleeve 648 to turn within the bore of the case.

The case 616 has six holes in its radial surface; one hole connects to a fluid relief line 658 and a second hole connects to a pressure feed 659. These two holes are above and below a passage 674 in main valve 618, respectively, when the main valve is centered. A third hole in case 616 admits fluid through the case from a pressure feed bypass 668 to an elongated hole 688 in main valve 618. Two additional holes connect the upper end of pressure equalization passage 634 and the lower end of pressure equalization passage 634 to the interior of case 616. The sixth hole in the case connects a passage 631 to the interior of case 616, below the bottom of a piston 621.

The closed end of case 616 has an integral cylindrical extension to accommodate pressure tight vertical motion of a poppet valve 666, and to allow fluid communication between pressure regulating passage 526 and poppet valve end cap 678. The closed end of case 616 also has a cylindrical extension which extends a predetermined distance into the space above main valve 618. The cylindrical extension tapers to a blunt end, and has a small axial passage which extends from the blunt end into the cylindrical extension a predetermined distance, then turns and extends radially to the surface of the cylindrical extension. This small passage (a soft stop 636) slows and stops the movement of the main valve 618 toward the closed end of case 616.

The main valve 618 consists of a solid cylindrical body having the following passages. The first vertical passage 674 extends upward from the bottom surface of the main valve to the upper surface of the main valve. Additionally, passage 674 extends radially to the radial surface of main valve 618 at the central transverse plane.

A second vertical passage within the main valve receives the poppet valve 666 and allows the vertical motion of poppet valve 666 within the main valve. It also extends upward from the bottom surface of the main valve to the upper surface of the main valve, but provides a shoulder at the top and bottom of the designed motion of the poppet valve, to limit the motion of the poppet valve. The upper section of the second vertical passage permits the installation of a poppet valve spring 676, and forms a pressure tight opening which permits the vertical motion of poppet valve stem 677.

Two lateral passages open from the passage containing the poppet valve. An elongated opening 688, which fully aligns with a hole in case 616 and with pressure feed bypass 668 which is connected to it, so long as main valve 618 is centered or is above a centered position.

Second opening 686, which opens to passage 674 and fully aligns with a channel 670 routed around poppet valve 666 if the poppet valve is seated at the bottom of its stroke, on the shoulder at the bottom of the main valve.

Additionally, the main valve 618 has a passage extending from the radial section of passage 674 to the upper surface of main valve 618, and has a passage extending from the radial section of passage 674 to the lower surface of main valve 618. These passages are relatively narrow nearest passage 674, then flare out to slightly wider passages. The passages then widen a second time just before reaching the upper or lower surface of the main valve. A soft stop bypass 638A and a soft stop bypass 638B are installed in these passages, each consisting of a solid sphere held against the flared passage transition by a helical compression spring, which is itself held in place by a ring secured to the main valve at the surface of the main valve.

A main valve spring 672 is preferably a helical compression spring. The maximum length of the spring is equal to the distance from the lower surface of closed end cap of case 616 to the top of the main valve when the main valve is centered. The spring provides a minimal amount of pressure when the main valve has moved from its centered position toward the closed end cap of the case.

A rod 619 is preferably a single solid cylindrical piece, but which has several functional components. The upper end of rod 619 is a narrow cylindrical extension that extends a predetermined distance above the top edge of piston 621. The cylindrical extension tapers to a blunt end, and has a small axial passage which extends from the blunt end into the cylindrical extension a predetermined distance, then turns and extends radially to the surface of the cylindrical extension. This small passage (a soft stop 620) slows and stops the movement of the rod toward main valve 618.

The sections of the rod which are immediately above and below piston 621 have nearly the same diameter as the inner bore of steering sleeve 648, but do not maintain a pressure tight relationship with the inner bore of the steering sleeve. Instead, these sections of rod have vertical flutes in them, corresponding to vertical flutes in the steering sleeve. The flutes in the steering sleeve and in the rod section above the piston comprise an upper thrust bearing race 641, and the flutes in the steering sleeve and in the rod section below the piston comprise a lower thrust bearing race 643. An upper thrust bearing 642 is made up of spherical bearings in the upper thrust bearing race, and a lower thrust bearing 644 is made up of spherical bearings in the lower thrust bearing race. The upper thrust bearing is held in place by a keeper 654, which is secured to rod 619 at the upper end of the flutes on the rod above piston 621.

Between the upper thrust bearing race and the lower thrust bearing race, piston 621 slides vertically in the pressure tight inside bore of steering sleeve 648.

The section of rod which is below the lower thrust bearing 644 has a reduced diameter, and extends through a pressure tight opening in the bottom of the steering sleeve, which itself extends through a pressure tight opening in the bottom of case 616. In this manner, rod 619 is able to move vertically in the bore of steering sleeve 648, and steering sleeve 648 is able to move radially in the bore of case 616.

Rod 619 (and its various components) thereby transmit the loading imposed by the fluid above piston 621 to a wheel support 640, which is attached to the lower end of rod 619.

A soft stop bypass 632 acts as a check valve in allowing the flow of fluid from pressure equalization passage 634 to passage 631. This facilitates the retraction of rod 619 into case 616 if the lower edge of piston 621 has closed off all fluid flow through soft stop 630. The soft stop bypass 632 does not permit fluid flow in the opposite direction. Conventional check valves may be used for this application.

The pressure equalization passage 634 provides a conduit to equalize the fluid pressure above piston 621 with the fluid pressure below the piston, through a lift solenoid 637.

Lift solenoid assembly 637, which is preferably an electro-hydraulic valve, allows the conversion of spring cylinder 655 from a single acting cylinder to a double acting cylinder. As a single acting cylinder, rod 619 retracts into the cylinder only under the influence of the dynamic load. Its conversion to a double acting cylinder allows the rod to be forced into the cylinder, possibly against resistance from the load. The parts of the lift solenoid are described below.

The wheel support 640 is secured to the end of rod 619 opposite piston 621, configured to be secured to the wheel assembly and to support the preferred embodiment and the dynamic load it supports.

The steering sleeve 648 is a hollow cylindrical solid allowing rod 619 and piston 621 to move freely (vertically) within its interior bore, and which itself rotates freely within the interior bore of case 616. Piston 621 maintains a pressure tight relationship with the interior bore of the steering sleeve at all times, and steering sleeve similarly maintains a pressure tight relationship with the interior bore of the case at all times. The interior bore of steering sleeve is fluted as described above, forming the outer half of the upper and lower thrust bearing races. Two channels 656 are routed around the exterior radial surface of the steering sleeve, vertically aligned with passage 631 and a soft stop 630, ensuring fluid flows regardless of the angular position of the rod. A ring shaped steering sleeve retainer 652 is secured to case 616, and holds the steering sleeve down against the small open end of case 616. The bottom of the steering sleeve extends through case 616, and is secured to a steering linkage 650 below the case.

A source of pressurized fluid 603 comprises a pressurized hydraulic fluid chamber 685 and a fluid reservoir 687, which together provide the motive force for moving the piston 621 and rod 619.

The fluid relief line 658 forms a conduit from the spring cylinder to the fluid reservoir 687.

The pressure feed 659 forms a conduit from a source of pressurized fluid to the spring cylinder.

A low pressure cut off 660 cuts off all fluid flows to the spring cylinder and to the lift cylinder in the event the pressure in pressure feed 659 drops below a predetermined level. The mechanism is a normally closed valve, opening only if the force exerted by fluid pressure on the valve body exceeds the force exerted by a spring on the valve body.

The poppet valve 666 is a solid cylinder having passage 670 routed around its radial surface. The passage fully aligns with elongated opening 688 and second opening 686 if the poppet valve is seated at the bottom of its stroke. A cylindrical poppet valve stem 677 extends axially upward from the main body of the poppet valve as a part of the poppet valve. The poppet valve stem is able to slide vertically through a pressure tight opening in the closed end of case 616. The poppet valve stem is hollow, and permits the installation of two small springs and two spheres 680. Small openings in the side of poppet valve stem 677 regulate the passage of fluid between the area occupied by poppet valve spring 676 and the area occupied by main valve spring 672, acting as soft stops (and soft stop bypasses) to control the motion of the poppet valve at either end of its stroke.

Poppet valve spring 676 is preferably a helical compression spring. The spring provides a minimal resistance to motion of the poppet valve upward from its centered position. The poppet valve spring should collapse completely before the main valve spring begins to compress in this embodiment.

Pressure feed bypass 668 is a conduit from pressure feed 659 to the spring cylinder 655.

Referring to FIGS. 7–10, the position control assembly 704 comprises a drive motor 705, which is preferably a small, reversible electric motor which can be manually or automatically operated to turn worm gear 707, moving position head 708 linearly along the machine threads of the worm gear. The drive motor is mounted to the dynamic load 102.

A position arm 709 is fixed to position valve 710 at one end, and is secured to the position head by a single connector which will allow the position head to pivot relative to the position arm. The single connector fits through a slot in the position arm, and slides along the slot as the position arm is moved from a horizontal position by the movement of the position head.

The position valve 710 is a circular valve body having a wide opening at its left side and a narrow opening at its right side. The wide opening is sealed from variably restricted pressure feed 562 and from fluid relief line 564 when the position arm is horizontal. The narrow opening is always open to passage 535. The funnel shaped opening (wide at the left side and narrow on the right side) is a position feed 711. The position valve rotates in a circular opening in a case 712, based on the angle of the position arm. If the position arm drops below horizontal (indicating case 516 and dynamic load 102 have moved vertically closer to one another), the position feed will open to variably restricted pressure feed 562, admitting fluid to passage 535 and lengthening lift cylinder 565. Conversely, if the position arm is raised above horizontal (indicating case 516 and dynamic load 102 have vertically separated), the position feed will open to fluid relief line 564, releasing fluid from passage 535 and shortening lift cylinder 565.

The case 712 contains a circular opening in which position valve 710 can rotate freely. The circular opening is accessible to fluid flows from variably restricted pressure feed 562 and fluid flows to fluid relief line 564, as indicated above. A passage within case 712 adjacent to the circular opening ensures that the narrow opening of position feed 711 is always in communication with passage 535. Case 712 is mounted to case 516, part of the lift cylinder.

Figure 6:
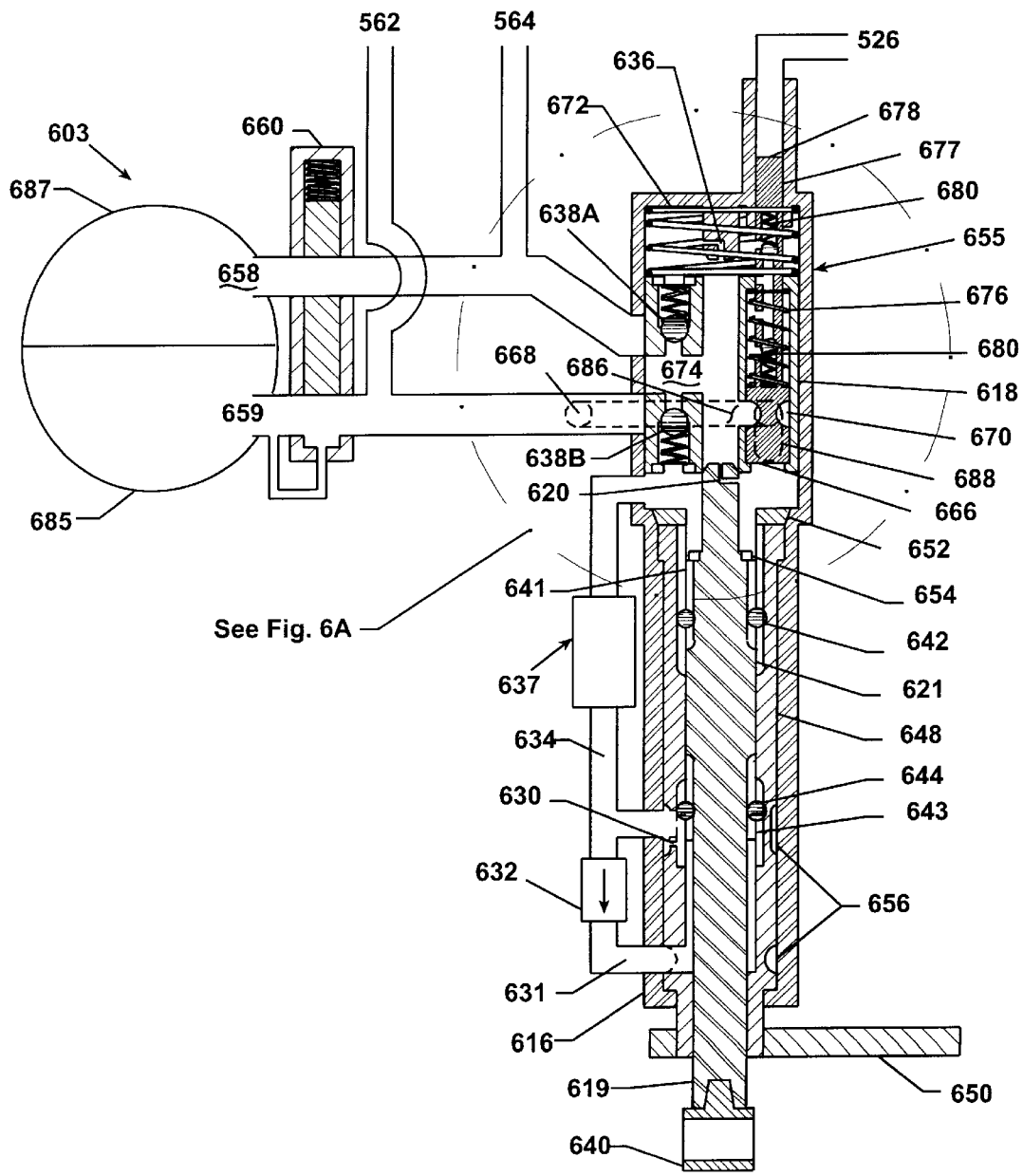

FIG. 5 is a sectional view of lift cylinder 565 which both supports a dynamic load at varying cylinder extensions and provides a pressure regulating signal to spring cylinder 655 (FIG. 6). The dynamic load is supported by frame member 517, which is secured to the end of rod 519 having piston 521 at its opposite end. Rod 519 has an axial passage which terminates near frame member 517 at pressure accumulator fill valve 525, and which also terminates at pressure accumulator 584 near piston 521. Rod 519 extends into case 516 through a pressure tight seal at the top of case 516, widening at piston 521 to form a pressure tight seal with the inside bore of case 516. Piston 521 contains a large axial bore in which an accumulator piston 527 slides, maintaining a pressure tight seal with the large axial bore. The upper surface of accumulator piston 527, the portion of the large axial bore above the accumulator piston, the axial passage, and the pressure accumulator fill valve define the variable volume of pressure accumulator 584.

Accumulator piston 527 is secured within the large axial bore by pressure accumulator end cap 523, which permits accumulator piston 527 to slide vertically in the large axial bore within predetermined limits. A large central opening within pressure accumulator end cap 523 allows fluid to pass through the end cap to facilitate movement of accumulator piston 527.

The loaded rod 519 pressurizes fluid internal to pressure accumulator 584, which pressurizes fluid internal to lift cylinder 565 through accumulator piston 527. Pressurized fluid which is released from lift cylinder 565 will allow rod 519 to retract into case 516. Conversely, pressurized fluid forced into lift cylinder 565 will cause rod 519 to extend from case 516, raising the load supported by frame member 517.

The bottom edge of piston 521 closes soft stop 520 as rod 519 nears a fully retracted position. When rod 519 is to be extended after having been fully retracted, pressurized fluid from position valve 704 (FIG. 7) is admitted through passage 535 to soft stop bypass 528, thence through passage 529 (beyond soft stop 520) to initiate the extension of rod 519 from case 516. Passage 529 also connects to pressure regulating passage 526 which governs the internal pressure of spring cylinder 655 (FIG. 6).

Similarly, the top edge of piston 521 closes soft stop 530 as rod 519 nears a fully extended position. When rod 519 is to be retracted after having been fully extended, the position valve 704 (FIG. 7) releases fluid from passage 535, causing soft stop bypass 532 to admit fluid through passage 531 (beyond soft stop 530) to initiate the retraction of rod 519 into case 516.

Pressure equalization passage 534 minimizes the quantity of fluid necessary to cause the extension or retraction of rod 519; the only fluid required from the source of pressurized fluid 603 is for the extension of rod 519 from case 516. The quantity of pressurized fluid necessary for such extension is equal to the volume of the rod moving out of case 516. Lift solenoid 537 is installed in pressure equalization passage 534 to facilitate the forced retraction of rod 519 into case 516.

Case 516 is supported by case 616 (FIG. 6) in the following manner: the weight imposed on frame member 517 is transmitted through rod 519, pressure accumulator 584, and accumulator piston 527, pressurizing the fluid that fills lift cylinder 565. The pressure of said fluid varies in direct proportion to the magnitude of the dynamic load, and is communicated to spring cylinder 655 (FIG. 6) via pressure regulating passage 526. Main valve 618 (FIG. 6) balances the pressure of the fluid internal to spring cylinder 655 (FIG. 6) with the pressure of the fluid internal to lift cylinder 565 by providing pressurized fluid from pressure feed 659 (FIG. 6) or releasing fluid to fluid relief line 658 (FIG. 6) as necessary. Maintaining a balance between the fluid pressures within spring cylinder 655 (FIG. 6) and lift cylinder 565 provides support equal to the dynamic loading at each instant through rod 619 (FIG. 6) and wheel support 640 (FIG. 6).

Figure 11:
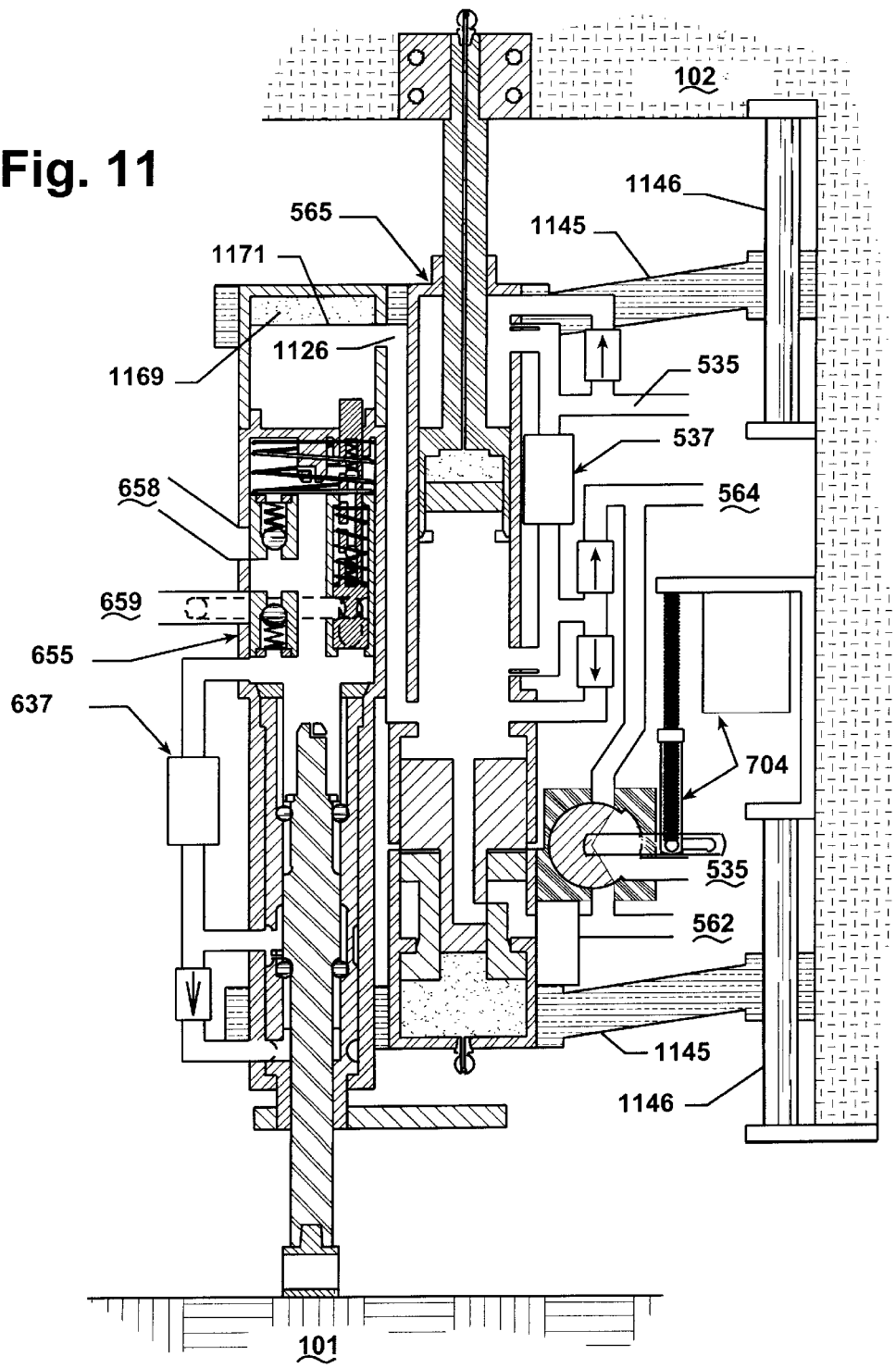
FIG. 11 illustrates the fifth embodiment mounted to a vehicle, capable of holding the wheel in vertical alignment throughout the entire travel of the fluid spring, regardless of the height of the vehicle.
Figure 12:
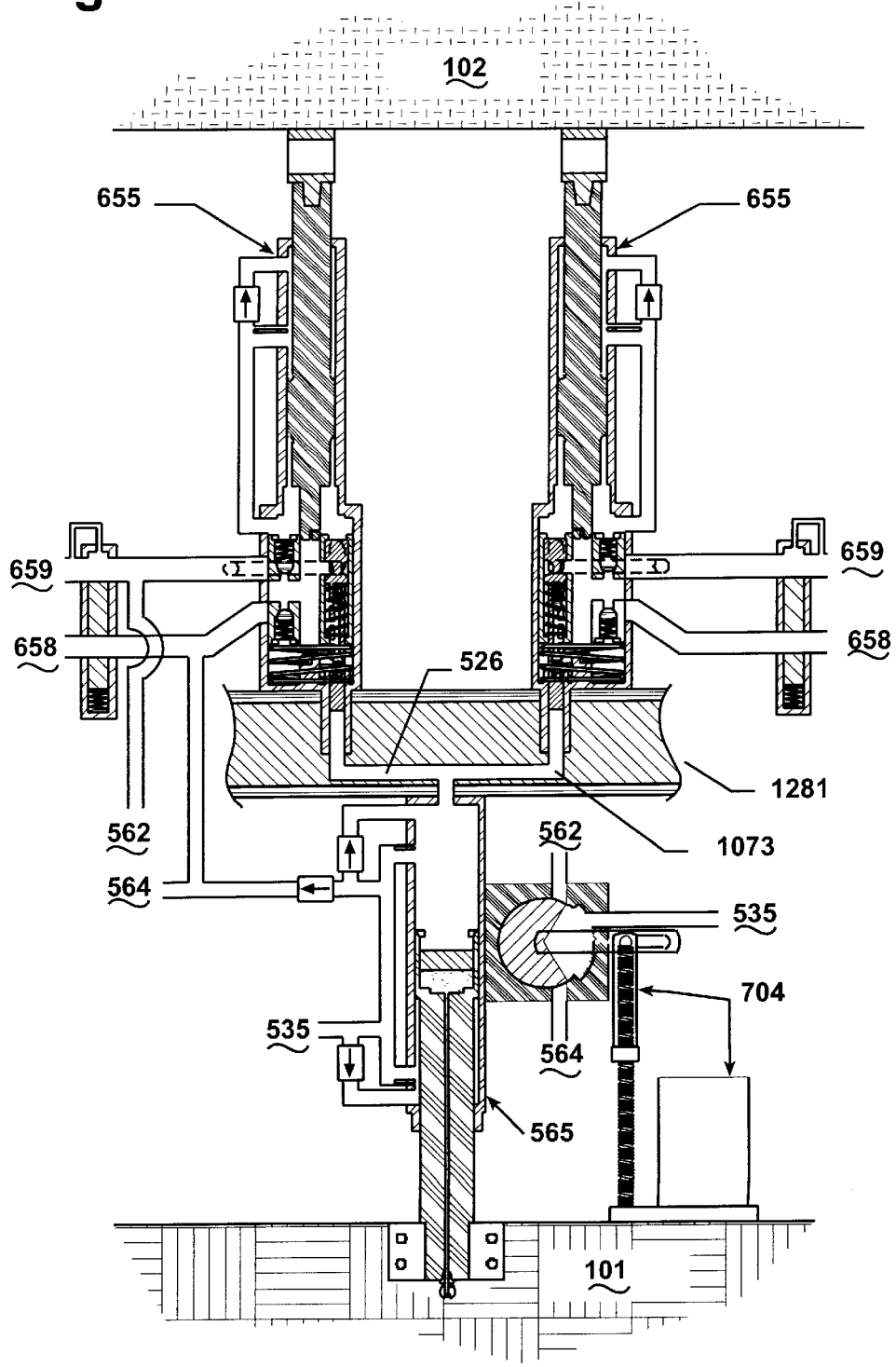
FIG. 12 illustrates the dynamic load-compensating fluid spring inverted for supporting heavy, vibrating equipment, and how a single lift cylinder can be sized and connected to regulate several spring cylinders.

Case 516 and case 616 (FIG. 6) may be attached directly to one another (as shown in FIG. 11), or may be connected to one another in another manner (for example, a fluid/structural linkage is shown in FIG. 12).

Note that rod 519 does not ordinarily extend or retract from case 516. It retracts into case 516 under two circumstances. First, if the spring cylinder 655 (FIG. 6) has retracted completely to absorb a severe bump, the shock will be transmitted directly from rod 619 through a soft stop 620 and a soft stop 636 to case 616. As case 616 supports case 516, the shock will move through the support to case 516, pressurizing the fluid which fills lift cylinder 565. The fluid pressure increase will overcome the resistance of overload relief valve 522, permitting fluid to escape through fluid relief line 564 to a fluid reservoir (not shown).

Second, if the position valve 704 (FIG. 7) dictates that rod 519 be retracted to re-establish the correct length of lift cylinder 565, fluid will be released through passage 535 and through the position valve to a fluid reservoir 687.

Similarly, note that rod 519 extends from the case of lift cylinder 565 under two circumstances. First, if the pressure exerted by preload accumulator 524 exceeds the pressure of the fluid which fills lift cylinder 565, main valve 561 will move toward frame member 517, aligning passage 563 with passage 538 (which passes through frame stop 567), and with variably restricted pressure feed 562. The alignment of passage 563 and variably restricted pressure feed 562 will allow the admission of additional fluid to the interior of lift cylinder 565 from variably restricted pressure feed 562, causing rod 519 to extend from case 516. The variably restricted pressure feed 562 is connected to a source of pressurized fluid 685; the flow rate through variably restricted pressure feed 562 is governed by electric valve 596, which is attached to sensors providing the desired operating characteristics of the dynamic load-compensating fluid spring.

In this preferred embodiment, the source of pressurized fluid 685 is an accumulator which itself is pressurized by a fluid pump, both having predetermined capacity and operating characteristics.

Second, if position valve 704 (FIG. 7) dictates that rod 519 be extended to reestablish the correct length of lift cylinder 565, fluid will be admitted to the interior of lift cylinder 565 through passage 535, causing rod 519 to extend from case 516.

Lift cylinder 565 incorporates soft stop 536 which slows and stops the travel of main valve 561 as it moves away from frame member 517. Soft stop 536 admits air between frame stop 567 and main valve 561 if main valve 561 has been moved toward frame member 517. Conversely, as main valve 561 is forced back toward preload accumulator 524 by the pressure of the fluid which fills lift cylinder 565, a small volume of air will be trapped and compressed between the main valve and the frame stop, slowing and stopping the movement of the main valve. The motion of main valve 561 toward frame member 517 is limited by valve stop 575.

The pressure of the fluid within spring cylinder 655 (and hence the amount of support it offers) is governed by the pressure within pressure regulating passage 526, which itself varies in direct proportion to the dynamic load imposed on lift cylinder 565 (FIG. 5) at each moment.

Wheel support 640 is secured to the end of rod 619 outside case 616. Rod 619 can be extended from case 616 or retracted into case 616 by the application or release of pressure on piston 621, which is located between upper thrust bearing 642 and lower thrust bearing 644.

Rod 619 extends above piston 621 and upper thrust bearing 642, where it tapers to soft stop 620 which slows and stops the retraction of rod 619 as it approaches main valve 618. Soft stop 636 slows and stops the movement of main valve 618 toward the end of case 616 opposite wheel support 640. Soft stop bypass 638A within main valve 618 provides fluid beyond soft stop 636, and soft stop bypass 638B (also within main valve 618) provides fluid beyond soft stop 620. The admission of this fluid initiates movement of main valve 618 away from case 616 toward wheel support 640, and movement of rod 619 away from main valve 618, respectively.

Similarly, the bottom edge of piston 621 closes soft stop 630 (located between the channels of a lower thrust bearing race 643) as rod 619 nears a fully extended position. Once rod 619 has reached a fully extended position, any additional inflow of pressurized fluid causes the pressure above piston 621 to rise rapidly. This additional pressure causes poppet valve 666 to rise to the top of its axial passage within main valve 618 and causes the main valve to center itself, closing pressure feed bypass 668 and pressure feed 659. The admission of fluid through soft stop bypass 632 and through passage 631 (beyond soft stop 630) initiates the retraction of rod 619 into case 616.

Pressure equalization passage 634 minimizes the quantity of fluid necessary from pressure feed 659 attached to a source of pressurized fluid 603 for the extension of rod 619; the only pressurized fluid required is equal to the volume of the rod moving out of case 616. Lift solenoid 637 is installed in pressure equalizing passage 634 to facilitate the forced retraction of rod 619 into case 616.

Spring cylinder 655 also has a steering sleeve 648 which provides a bore in which rod 619 and piston 621 can slide vertically, and which is itself free to rotate in the bore of case 616. The end of steering sleeve 648 nearest wheel support 640 is secured to steering linkage 650. Torque applied to steering sleeve 648 by steering linkage 650 is transmitted to rod 619 through upper thrust bearing 642 and lower thrust bearing 644, then transmitted through rod 619 to wheel support 640. Steering sleeve retainer 652 secures the end of steering sleeve 648 nearest main valve 618.

Upper thrust bearing race 641 holds upper thrust bearing 642 between rod 619 (above piston 621) and steering sleeve 648. Upper thrust bearing 642 is secured by keeper 654 which is attached to rod 619 above upper thrust bearing race 641. Lower thrust bearing race 643 similarly holds lower thrust bearing 644 between rod 619 (below piston 621) and steering sleeve 648.

The fluid passages for soft stop 630 and for soft stop bypass 631 terminate at the inside surface of case 616 opposite channels 656 routed around the outer circumference of steering sleeve 648. Channels 656 facilitate fluid flows while allowing steering sleeve 648 and rod 619 to rotate freely in response to torque applied by steering linkage 650.

Pressure feed 659 attached to a source of pressurized fluid 685, and fluid relief line 658 attached to a fluid reservoir 687 are both shut off by low pressure cut off 660 in the event pressure in pressure feed 659 drops below a preset level. Variably restricted pressure feed 562 and fluid relief line 564 are also both subject to low pressure cut off 660.

Pressure regulating passage 526 conducts pressurized fluid from the interior of lift cylinder 565 (FIG. 5) to poppet valve end cap 678, moving main valve 618 as necessary to ensure the pressure within the spring cylinder 655 matches the pressure within the lift cylinder 565 (FIG. 5).

Figure 6A:
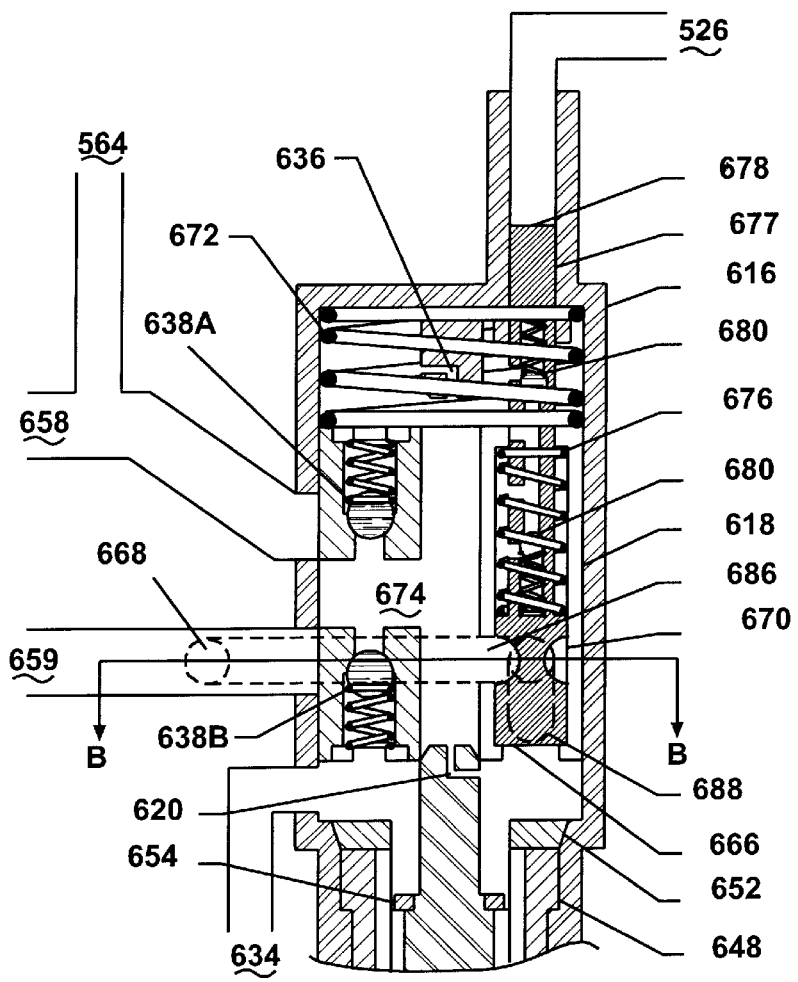
FIG. 6A is an enlarged view of a portion of the valving of the support cylinder shown in FIG. 6.
Figure 6B:
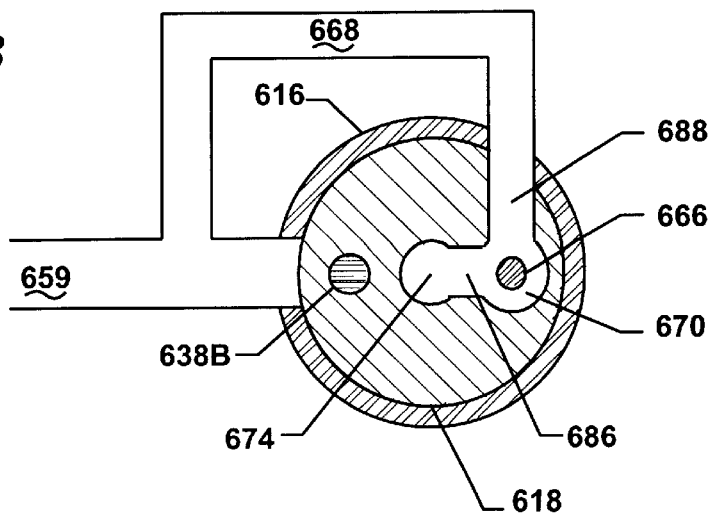
FIG. 6B shows a cross section taken along line 6B—6B of FIG. 6A.

Referring to FIG. 6A, the main valve 618 is shown in greater detail.

Main valve 618 contains axially operated poppet valve 666. Pressure feed bypass 668 conducts pressurized fluid from pressure feed 659 to an opening in case 616. When passage 674 in main valve 618 is centered between pressure feed 659 and fluid relief line 658, elongated opening 688 in the side of main valve 618 admits the pressurized fluid from pressure feed bypass 668 to poppet valve 666 through said opening in case 616. Poppet valve spring 676 pushes poppet valve 666 down, aligning channel 670 which is routed around the outer circumference of poppet valve 666 with second opening 686 in main valve 618. The pressurized fluid then passes through second opening 686, pressurizing the area above piston 621. Note that passage 674 in main valve 618 is held in such a centered position by main valve spring 672 unless pressure variations within spring cylinder 655 push main valve 618 off center.

The pressure in pressure regulating passage 526 (FIGS. 5 and 6) governs the pressure in spring cylinder 655; excessive pressures in spring cylinder 655 move main valve 618 away from wheel support 640, releasing pressure from spring cylinder 655 through passage 674 and fluid relief line 658 to fluid reservoir 687. Conversely, pressure within spring cylinder 655 which is less than the pressure in pressure regulating passage 526 (FIGS. 5 and 6) causes main valve 618 to move toward wheel support 640, admitting pressurized fluid to spring cylinder 655 from pressure feed 659 through passage 674 in main valve 618.

Poppet valve stem 677 extends through a pressure-tight opening at the end of case 616 furthest from wheel support 640 (FIG. 6). Poppet valve stem 677 is hollowed out, permitting the installation of two small springs and two ball check valves 680 which act as soft stops (and their bypasses) to control the motions of poppet valve 666. Fluid moved by poppet valve end cap 678 displaces piston 521 (FIG. 5) minimally.

The suspension disclosed in FIGS. 5–10 provides for the support of a dynamic load fluctuating either slowly due to changes to the static load condition (passengers, cargo, fuel, etc.) or rapidly due to changes to the dynamic load condition (acceleration, cornering, wind, pulling a trailer, etc.). The suspended load is isolated from bumps and holes to a degree that cannot be duplicated by conventional spring suspensions.

The operation of the suspension incorporating the dynamic load-compensating fluid spring is controlled by the interaction of the lift cylinder and the spring cylinder and has various operational modes.

1. Operation of the Lift Cylinder (FIG. 5) as a Pressure Control

The support of the dynamic load attached to frame member 517 is dependent upon the support of piston 521 and rod 519 by pressurized fluid contained in lift cylinder 565. Minor fluctuations in the fluid pressure cause vibration of accumulator piston 527 and are filtered by pressure accumulator 584. The pressure of the fluid internal to lift cylinder 565 is directly proportional to the variations in the dynamic load imposed on frame member 517. The pressurized fluid is contained in pressure regulating passage 526, and is made available as a pressure signal at the spring cylinder 655 (FIG. 6). Further explanation of lift cylinder 565 occurs in Section 3, below, following the explanation of spring cylinder 655 (FIG. 6).

2. Operation of the Spring Cylinder (FIG. 6) Under Varying Load Conditions

Main valve 618 is incorporated in spring cylinder 655 to ensure the internal fluid pressure within spring cylinder 655 is kept nearly identical with the internal fluid pressure of lift cylinder 565 (FIG. 5), which itself fluctuates in direct proportion to the magnitude of the dynamic load. Any movement of main valve 618 is caused by movement of poppet valve 666 at either end of its stroke. The poppet valve end cap 678 and an equal surface area on the bottom of the poppet valve 666 are subject to the internal pressures of lift cylinder 565 (FIG. 5), and of the spring cylinder 655, respectively.

Should the dynamic load increase on lift cylinder 565 (FIG. 5), fluid pressure in pressure regulating passage 526 will increase, exerting additional pressure on poppet valve end cap 678, pushing poppet valve 666 toward wheel support 640, and increasing the internal fluid pressure of spring cylinder 655. The pressure increase will be caused by fluid displaced by the movement of poppet valve 666 and by the admission of pressurized fluid from pressure feed bypass 668. The pressure increase may additionally be caused if poppet valve 666 reaches the end of its stroke and moves main valve 618 toward wheel support 640, admitting pressurized fluid from pressure feed 659 through passage 674. The increased pressure provides an increase in support directly proportional to the increase in the dynamic load.

Similarly, if the dynamic load should decrease, fluid pressure in pressure regulating passage 526 will exert less pressure on poppet valve end cap 678, causing fluid pressure above piston 521 to force poppet valve 666 away from wheel support 640, reducing the internal fluid pressure of spring cylinder 655. The pressure decrease will be caused by fluid displaced by the movement of poppet valve 666. The pressure decrease may additionally be caused if poppet valve 666 reaches the end of its stroke and moves main valve 618 away from wheel support 640, releasing pressurized fluid from passage 674 to fluid relief line 658. This reduced pressure provides a reduction in support directly proportional to the decrease in the dynamic load.

In either case, the dynamic load fluctuation is immediately and accurately reflected at the wheel support 640. The dynamic load-compensating fluid spring acts as a rod (neither compressing nor extending) in response to fluctuating dynamic load conditions. It resists sagging, squatting, or diving as static loads and dynamic forces imposed by acceleration, maneuvering, etc. vary.

3. Operation of the Spring Cylinder (FIG. 6) Over Bumps and Depressions

The operation of spring cylinder 655 differs considerably, however, if the wheel assembly encounters a bump or hole in the road.

If the wheel assembly encounters a small bump in the road, the wheel support 640 will move toward case 616, increasing the pressure above piston 621 as rod 619 retracts into case 616. The increased fluid pressure will push the poppet valve up against the fluid pressure in pressure regulating passage 526, and will cause some fluid to be displaced from the area above piston 621 to the area below piston 621 through pressure equalization passage 634 and lift solenoid 637. The ratio of the stroke of poppet valve stem 677 to the stroke of rod 619 is inversely proportional to the square of their diameters. If rod 619 has a diameter of 16 mm, and poppet valve stem 677 has a diameter of 4 mm, poppet valve 666 will move 16 mm for every 1 mm of travel by rod 619. Similarly, the ratio of the stroke of poppet valve stem 677 to the stroke of rod 519 (FIG. 5) is inversely proportional to the square of their diameters. Very minimal movement of rod 619 will cause a rapid shut off of channel 670 in poppet valve 666, which will cause a minimal movement of fluid in passage 526. Much of this minimal fluid movement will be absorbed by pressure accumulator 584 (FIG. 5), further reducing the transmission of shock through rod 519 (FIG. 5) to frame member 517 (FIG. 5). The pressure accumulator 584 (FIG. 5) filters high frequency fluid noise in this manner.

Medium and large bumps force poppet valve 666 up to the top of its stroke, closing second opening 686. Additional upward movement of poppet valve 666 then causes main valve 618 to move up, releasing excess pressure above piston 621 through passage 674 to fluid relief line 658 which is connected to the fluid reservoir. As soon as the wheel assembly begins to drop on the back side of the bump, the internal fluid pressure within spring cylinder 655 drops, and main valve spring 672 pushes main valve 618 back to a centered position between pressure feed 659 and fluid relief line 658. Note that pressure feed bypass 668 fully aligns with elongated opening 688 in main valve 618 if passage 674 is above pressure feed 659. Poppet valve spring 676 pushes poppet valve 666 down to its seat at the bottom of main valve 618, opening pressure feed bypass 668 and elongated opening 688 to channel 670, which channel then aligns with second opening 686. This allows the pressurized fluid from pressure feed bypass 668 to enter the area above piston 621, and forces rod 619 to extend from case 616. Additionally, if poppet valve 666 continues to move downward at the end of its stroke, it will cause main valve 618 to move toward wheel support 640, opening passage 674 to pressure feed 659. As rod 619 approaches full extension, the bottom edge of piston 621 closes soft stop 630, preventing the release of any further fluid from the area below piston 621. The next incremental admission of fluid above piston 621 will push poppet valve 666 up within main valve 618, and will center passage 674 in main valve 618 between fluid relief line 658 and pressure feed 659, preventing the entry of any further fluid into spring cylinder 655 from either pressure feed 659 or from pressure feed bypass 668. The internal pressure within spring cylinder 655 will therefore stabilize, nearly equal to the internal pressure of lift cylinder 565 (FIG. 5) at any instant. The vertical motions of poppet valve 666 are controlled at either end of the poppet valve's stroke by two small springs and two ball check valves 680, which act as soft stops at either end of the poppet valve's stroke.

Any additional internal pressure within spring cylinder 655 caused by bumps in the road is vented through main valve 618, allowing spring cylinder 655 to retract as necessary, without the progressively increasing resistance which is associated with conventional air suspensions, helical coil spring suspensions, leaf spring suspensions, or torsion springs.

If the wheel assembly encounters a hole in the road while travelling slowly or while maneuvering, the internal fluid pressures within both the spring cylinder 655 and the lift cylinder 565 drop. When the force exerted by the preload accumulator 524 exceeds the force exerted by the fluid internal to lift cylinder 565, main valve 561 moves toward frame member 517, aligning passage 563 with passage 538 and with variably restricted pressure feed 562. This alignment allows the admission of fluid through variably restricted pressure feed 562 into lift cylinder 565 in accordance with steering, braking, acceleration, and speed sensors which are used to regulate electric valve 596, allowing fluid into lift cylinder 565 at a predetermined rate. Lift cylinder 565 is thus forced to extend, causing the wheel assembly to track through the hole and enhancing the stability of the vehicle. The spring cylinder 655 absorbs the subsequent impact of the wheel assembly with the far side of the hole as if it were a bump, as indicated above.

If the wheel assembly encounters a hole in the road while travelling more rapidly (in a relatively straight line, with minimal acceleration or deceleration), the internal fluid pressures within both the spring cylinder 655 and the lift cylinder 565 will drop, as described to the scenario indicated above. When the force exerted by preload accumulator 524 exceeds the force exerted by the pressurized fluid internal to lift cylinder 565, main valve 561 moves toward frame member 517, aligning passage 563 with passage 538, and with variably restricted pressure feed 562, also as indicated above. This alignment allows the admission of fluid through variably restricted pressure feed 562 into lift cylinder 565 in accordance with steering, braking, acceleration, and speed sensors which are used to regulate electric valve 596, either allowing fluid into lift cylinder 565 slowly or closing the valve entirely. The length of the lift cylinder 565 remains unchanged, and the wheel assembly is 'carried' across the hole, resuming travel on the far side of the hole without impacting the far side of the hole.

The operation of electric valve 596 can be controlled by sensors other than those indicated above, in accordance with the desired operating characteristics of the fluid spring; for instance, a part time four wheel drive vehicle may include a sensor reflecting whether a particular wheel is engaged to the transmission. Similarly, the operational characteristics of the fluid spring may necessitate similar control of overload relief valve 522 by appropriate sensors, allowing similar control of retraction of rod 519 into case 565.

4. Operation of the Spring Cylinder (FIG. 6) in Steering

Spring cylinder 655 may optionally be equipped with steering sleeve 648 between case 616 and rod 619. Steering sleeve retainer 652 restricts steering sleeve 648 from any vertical movement. Keeper 654 similarly holds upper thrust bearing 642 in upper thrust bearing race 641. Lower thrust bearing 644 (contained in lower thrust bearing race 643) and upper thrust bearing 642 allow rod 619 to move vertically without resistance, but ensure that torque applied by steering linkage 650 to steering sleeve 648 is transmitted to rod 619, and thence to wheel support 640. Note that the torque could similarly be transmitted from the steering sleeve to the rod using a keyway and key, or by using a splined interface between the steering sleeve and rod. In this manner, steering linkage 650 is isolated from the rapid vertical motion of wheel support 640, while permitting accurate directional control of the wheel support. Upper thrust bearing 642 and lower thrust bearing 644 also provide substantial support to rod 619, resisting lateral forces on rod 619 imposed by cornering, braking, accelerating, etc. which would otherwise cause lateral loading of the piston 621 and seals for spring cylinder 655. Two channels 656 routed around the outer circumference of steering sleeve 648 permit fluid flows through the sleeve regardless of its angular position.

5. Operation of the Pressure Accumulator 584 (FIG. 5) as a High Frequency Filter Rapid, small movements of poppet valve end cap 678 cause high frequency 'noise' in the fluid above it. This fluid noise passes from passage 526 into lift cylinder 565, below piston 521. The noise causes vibration of accumulator piston 527, which is filtered by pressure accumulator 584; gross movements of piston 527 are limited by pressure accumulator end cap 523. Fluid movement which is not absorbed by pressure accumulator 584 will cause vertical displacement of rod 519 in lift cylinder 565. This movement will be minimal, however, as the area of poppet valve end cap 678 is substantially smaller than the cross sectional area of rod 519. Note that the pressure accumulator 584 in this embodiment should be sized to facilitate filtering high frequency noise in the fluid and to facilitate movement of the poppet valve 666; excess capacity will result in the pressure accumulator 584 acting as an air spring rather than as a high frequency filter. Some consideration can be given to alternate embodiments for the pressure accumulator 584, as follows:

Providing passage 526 with flexible walls, or

Providing a pressure accumulator external to lift cylinder 565 and spring cylinder 655, or Filling the lift cylinder 565 with gas or a compressible fluid, or Providing an additional accumulator in spring cylinder 655, as shown in FIG. 11, based on the desired operating characteristics of the fluid spring. Pressure accumulator fill valves 525 allow charging of both pressure accumulator 584 and preload accumulator 524 in this preferred embodiment.

6. Operation of the Spring Cylinder (FIG. 6) Over Extreme Terrain Conditions While operating on a relatively smooth road, main valve 618 is held in a centered position by balancing a combination of several downward forces (main valve spring 672 and fluid pressure on poppet valve end cap 678) with the upward force of the pressurized fluid within spring cylinder 655. Spring cylinder 655 seeks to remain fully extended in the following manner:

Poppet valve 666 is pushed down by the force exerted by pressurized fluid within pressure regulating passage 526 acting on poppet valve end cap 678, and is additionally pushed down by the poppet valve spring 676. Note that the pressure attributed to poppet valve spring 676 must be less than the pressure attributed to main valve spring 672 in this embodiment. If poppet valve 666 is pushed down to the bottom of main valve 618, fluid can be admitted above piston 621 through second opening 686 and channel 670 from elongated opening 688 which is aligned with pressure feed bypass 668. Additionally, if the downward force continues to push poppet valve 666 down at the end of its stoke, main valve 618 will be pushed down, admitting fluid from pressure feed 659 through passage 674. This forces the extension of rod 619 from case 616 until the lower edge of piston 621 closes soft stop 630. Further admission of fluid to spring cylinder 655 increases the pressure of the fluid internal to the spring cylinder, pushing poppet valve 666 up within main valve 618, and centering passage 674 in main valve 618 between pressure feed 659 and fluid relief line 658. This prevents the entry of any further fluid into spring cylinder 655, as indicated above. Soft stop 630 slows and stops the extension of rod 619 as it approaches full extension, and soft stop bypass 632 allows pressurized fluid access behind soft stop 630 through passage 631 to initiate retraction of rod 619 into case 616.

If the terrain becomes substantially rougher, spring cylinder 655 may collapse completely. A large, raised bump in the road causes the fluid pressure internal to spring cylinder 655 to suddenly increase, moving poppet valve 666 to the top of its stroke. Poppet valve 666 then continues to move up, causing main valve 618 to move away from wheel support 640 and opening passage 674 to fluid relief line 658.

The release of fluid from spring cylinder 655 allows rod 619 to retract into the spring cylinder 655, absorbing the large raised bump. Soft stops 620 and 636 slow and stop the movement of rod 619 and main valve 618, respectively, as rod 619 retracts completely into spring cylinder 655.

After collapsing completely, spring cylinder 655 initiates its extension in the following manner: the pressure feed bypass 668 is aligned with the bottom of elongated opening 688 while main valve 618 is at the top of its stroke. When fluid pressure above piston 621 drops (i.e. the wheel support 640 is past the large, raised bump), fluid pressure in pressure regulating passage 526 pushes poppet valve 666 down, aligning channel 670 with elongated opening 688 and with second opening 686. The alignment of pressure feed bypass 668, elongated opening 688, channel 670, and second opening 686 allows fluid access behind soft stops 620 and 636 through passage 674 and soft stop bypasses 638A and 638B, initiating extension of rod 619 and re-centering main valve 618.

Once the cylinder has collapsed completely in this manner, the dynamic load-compensating fluid spring can collapse further, as indicated in Section 7, below.

7. Operation of the Lift Cylinder (FIG. 5) Over Extreme Terrain Conditions

The lift cylinder 565 can collapse by releasing fluid from an overload relief valve 522 through fluid relief line 564 to fluid reservoir 687 if the fluid pressure within lift cylinder 565 exceeds a predetermined limit. Such an excessive fluid pressure would result if the height of a large bump exceeded the travel available in spring cylinder 655. Note that any movement of rod 519 within lift cylinder 565 will cause some fluid to be displaced from the area above piston 521 to the area below piston 521 through pressure equalization passage 534 and lift solenoid 537.

FIG. 5 shows the incorporation of soft stops 520 and 530, which slow and stop the movement of rod 519 as it retracts fully or reaches full extension, respectively. Soft stop bypass 528 allows fluid access through passage 529 behind soft stop 520 to initiate the extension of rod 519 from case 516. Soft stop bypass 532 allows fluid access through passage 531 behind soft stop 530 to initiate the retraction of rod 519 into case 516. Movement of the main valve 561 is also slowed and stopped by soft stop 536 as it approaches its fully retracted position against frame stop 567. If both the spring cylinder and the lift cylinder collapse completely without having absorbed the large, raised bump, the fluid pressure below soft stop 520 will increase dramatically, causing frame stop 567 and main valve 561 to compress preload accumulator 524.

Further, lift cylinder 565 incorporates preload accumulator 524 which causes lift cylinder 565 to extend under certain circumstances. If the vehicle is parked with a wheel assembly over a depression, the internal fluid pressures within both the spring cylinder 655 (FIG. 6) and the lift cylinder 565 drop. The force exerted by the preload accumulator 524 will exceed the force exerted by the pressurized fluid internal to lift cylinder 565, forcing main valve 561 upward, although the upward movement of main valve 561 is limited by valve stop 575. This movement admits fluid by aligning passage 563 with passage 538 and with passage 591, and with variably restricted pressure feed 562 as indicated in Section 3 (Operation of the spring cylinder over bumps and depressions), above. The admission of pressurized fluid causes the lift cylinder 565 to extend, forcing the wheel assembly into the hole, ensuring the stability of the vehicle.

The variably restricted pressure feed 562 can provide additional stability in the above manner in accordance with driving conditions (ground speed, steering position, acceleration or deceleration, etc.). It provides such additional stability while maneuvering by admitting pressurized fluid through electric valve 596, forcing lift cylinder 565 to extend at a predetermined rate (in accordance with the driving conditions), which causes the wheel support 640 (FIG. 6) to track through potholes and depressions. The spring cylinder absorbs the impact of the wheel support 640 (FIG. 6) with the far side of the pothole or depression as if it were a raised bump in the road, as described above. Note that this preferred embodiment allows one section of the dynamic load-compensating fluid spring (the lift cylinder 565) to slow and stop its extension while another section (the spring cylinder 655) begins to retract simultaneously, improving the reaction time of the fluid spring as a whole.

If the wheel support 640 encounters a hole in the road while travelling more rapidly (and in a straight line), steering, braking, acceleration, and speed sensors can be used to regulate electric valve 596, restricting fluid flow through variably restricted pressure feed 562. The length of the lift cylinder 565 remains unchanged, and the wheel assembly is 'carried' across the hole, resuming travel on the far side of the hole without impacting the far side of the hole.

Note also that FIG. 5 shows passage 535, which allows a position valve 704 (FIG. 7) to admit (or release) fluid, allowing automatic or manual control of the height of the vehicle. This mechanism is necessary to allow lift cylinder 565 to be restored to its correct length in this preferred embodiment after having either discharged fluid through overload relief valve 522 or admitted fluid through variably restricted pressure feed 562, both indicated above. Fluid flows through position valve 704 (FIG. 7) are shut off by a position solenoid 1053 (FIG. 10) under certain predetermined conditions. Such conditions may include main valve 561 being displaced by preload accumulator 524, overload relief valve 522 being open, the speed of the vehicle approaching zero, lift solenoid 537 and/or lift solenoid 637 forcing the retraction of rod 519 and/or 619 into their respective cases, or other such criteria as may be desirable. The lift solenoids are discussed in Section 10, below.

8. Operation of the Lift Cylinder (FIG. 5); Manual and Automatic Height Modifications The position valve 704 allows the vehicle designer considerable flexibility in easing access to low riding sports cars by elevating the car, lowering truck beds for easier loading and unloading, and improving gas economy by permitting the ride height of any vehicle so equipped to be automatically adjusted as the speed of the vehicle varies. This also ensures that the structural members (bumpers, side guard door beams, and frames) of vehicles so equipped will meet in the event a collision occurs, promoting the safety of occupants in sedans which may collide with sport utility vehicles, pickup trucks, or commercial vehicles.

The admission or release of fluid through passage 535 accomplishes the adjustment of the height of the lift cylinder. Note that this adjustment can be used both to adjust the height of the vehicle, and that it may also be used to instantaneously adjust the trim of the vehicle. Presently, vehicular load leveling systems must operate slowly, to avoid adjustments which conflict with the movement of the unsprung load relative to the sprung load. The dynamic load-compensating fluid spring avoids this problem in the following manner:

1. Relative movement of the sprung and unsprung masses occurs in a component which is not compressed by the vehicle, nor is it compressed by dynamic forces acting on the vehicle—the spring cylinder 655 (FIG. 6).

2. Compression of the lift cylinder 565 (FIG. 5) caused by dynamic forces acting on the vehicle is limited to compression of the pressure accumulator 584 (FIG. 5) or of the preload accumulator 524 (FIG. 5). This compression is minimized by the small capacity of the pressure accumulators, and is immediately compensated by position valve 704 (FIG. 7)—without altering affecting the operation of the spring cylinder 655 (FIG. 6).

Neither modifying the load (by adding passengers, cargo, or trailers) nor modifying the ride height of the vehicle affects the quality of the ride offered by the dynamic load-compensating fluid spring. Spring cylinder 655 (FIG. 6) is neither shackled to lower the vehicle nor extended to raise the vehicle, as would be the case with a conventional suspension.

Failure of the hydraulic system supplying the fluid spring will result in a reduced pressure in pressure feed 659 (FIG. 6), which will cause low pressure cut off 660 (FIG. 6) to close, isolating both the pressure feed 659 (FIG. 6) and the fluid relief line 658 (FIG. 6) from the hydraulic system. The pressure accumulator 584 and preload accumulator 524 would continue to provide some flexibility to the fluid spring under such circumstances.

The operation of position control 704 is straightforward; any vertical movement of position head 708 and case 712 relative to one another will cause position arm 709 to move from a horizontal position. The vertical motion can be caused by electric motor 705 turning worm gear 707 and causing the position head to move, or it can be caused by movement of case 516 as fluids compress within lift cylinder 565. Either movement will rotate position valve 710 and open the wide end of position feed 711 to either variably restricted pressure feed 562 or to fluid relief line 564. The narrow end of position feed 711 is always open to passage 535, and will either admit or discharge fluid based on the vertical displacement of case 712 and position head 708 relative to one another. Such fluid movement will return case 712 and position head 708 to the desired vertical relationship to one another. Compensation for any minor compression of fluids within lift cylinder can occur very quickly without affecting the operation of the spring cylinder, and automatic or manual adjustments can be made to the height of the lift cylinder without affecting the operation of the spring cylinder.

Auxiliary Functions; Description and Operation of Lift Solenoids—FIG. 8 and FIG. 9

Lift solenoids 637 (FIG. 6) and 537 (FIG. 5) provide alternate paths for fluid in pressure equalization passages 634 (FIG. 6) and 534 (FIG. 5), respectively.

Lift solenoids 537 and 637 are similar in function (although the pressure and relief line connections are reversed to maintain functionality), and therefor their parts will be discussed together.

Each lift solenoid comprises a case 806 (906) which contains a circular opening in which valve body 813 (913) can rotate freely. The case has two ports which conduct fluid from pressure equalization passage 534 (634) to the valve body. The case also has a port which conducts fluid from variably restricted pressure feed 562 to the valve body, and a port which conducts fluid from the valve body to fluid relief line 564. Additionally, the case has an internal passage which ensures the two ports connected to pressure equalization passage 534 (634) are contiguous with one another if a spring coil 814 (914) is energized.

The valve body 813 (913) consists of a solid cylindrical valve spool with two passages through the radial surface of the cylinder, although the passages are not radial to the cylinder. The passages are parallel to one another, and are equidistant from the center of the cylinder by a predetermined amount. An actuating lever 882 (982) is attached to the center of the cylindrical valve spool.

The spring coil 814 (914) is an electrically operated solenoid which is nearest case 806 (906) of the lift solenoid.

A lift coil 815 (915) is an electrically operated solenoid which is furthest from case 806 (906) of the lift solenoid.

A solenoid armature 839 (939) is connected to actuating lever 882 (982) by a single connector which will allow the actuating lever to pivot relative to the solenoid armature. The single connector fits through a slot in the actuating lever, and slides along the slot as the actuating lever is moved by the solenoid armature moving into the lift coil or moving into the spring coil. If the spring coil is energized, pressure equalization passage 534 (634) will be contiguous through the lift solenoid 537 (637). If the lift coil is energized, however, variably restricted pressure feed 562 will be connected to the rod side of the piston 521 (621), and fluid relief line 564 will be connected to the opposite side of the piston, forcing the rod to retract into the case.

The lift solenoids operate as follows:

When spring coil 814 (FIG. 8) is energized, solenoid armature 839 (FIG. 8) is pulled into spring coil 814 (FIG. 8), causing actuating lever 882 (FIG. 8) to rotate valve body 813 (FIG. 8) clockwise in case 806 (FIG. 8). The upper portion of pressure equalization passage 534 (FIG. 5, above lift solenoid 537) is routed to the lower portion of pressure equalization passage 534 (FIG. 5, below lift solenoid 537), allowing pressure equalization passage 534 to function as previously described in lift cylinder 565.

Alternately, when a lift coil 815 (FIG. 8) is energized, solenoid armature 839 (FIG. 8) is pulled into lift coil 815 (FIG. 8), causing actuating lever 882 (FIG. 8) to rotate valve body 813 (FIG. 8) counter-clockwise in case 806 (FIG. 8). Variably restricted pressure feed 562 (FIG. 5) is thereby connected to the upper portion of pressure equalization passage 534 (FIG. 5, above lift solenoid 537). Fluid relief line bypass 564 (FIG. 5) is simultaneously routed to the lower portion of pressure equalization passage 534 (FIG. 5, below lift solenoid 537). This alternate fluid routing forces rod 519 (FIG. 5) to retract into case 516 (FIG. 5).

Similarly, when spring coil 914 (FIG. 9) is energized, solenoid armature 939 (FIG. 9) is pulled into spring coil 914 (FIG. 9), causing actuating lever 982 (FIG. 9) to rotate valve body 913 (FIG. 9) clockwise in case 906 (FIG. 9). Variably restricted pressure feed 562 (FIG. 5) and fluid relief line bypass 564 (FIG. 5) are simultaneously terminated at position valve 913 (FIG. 9), and the upper portion of pressure equalization passage 634 (FIG. 6, above lift solenoid 637) is connected to the lower portion of pressure equalization passage 634 (FIG. 6, below lift solenoid 637), allowing pressure equalization passage 634 to function as previously described in spring cylinder 655.

Alternately, when lift coil 915 (FIG. 9) is energized, solenoid armature 939 (FIG. 9) is pulled into lift coil 915 (FIG. 9), causing actuating lever 982 (FIG. 9) to rotate valve body 913 (FIG. 9) counter-clockwise in case 906 (FIG. 9). Variably restricted pressure feed 562 (FIG. 5) is thereby connected to the lower portion of pressure equalization passage 634 (FIG. 6, below lift solenoid 637). Fluid relief line bypass 564 (FIG. 5) is simultaneously routed to the upper portion of pressure equalization passage 634 (FIG. 6, above lift solenoid 637). This alternate fluid routing forces rod 619 (FIG. 6) to retract into case 616 (FIG. 6).

Energizing lift coil 815 and lift coil 915 causes retraction of rods 519 (FIG. 5) and 619 (FIG. 6), and enables minor loads (such as tires, wheels, and axles) to be lifted.

Energizing spring coil 814 and spring coil 914 allows rod 519 (FIG. 5) to return to the position dictated by position control 704 (FIG. 7), and allows rod 619 (FIG. 6) to return to full extension. Both the lift cylinder and the spring cylinder can then function as a fluid spring.

Linking Components of the Preferred Embodiments—FIGS. 10–12

FIG. 12 clarifies the fluid interconnections between components of the dynamic load-compensating fluid spring. All components have been depicted in previous drawings with the exception of a position solenoid 1053, which prevents position control 704 from modifying the length of lift cylinder 565, based on the desirable operational characteristics of the fluid spring. Such conditions may include main valve 561 being displaced by preload accumulator 524, overload relief valve 522 being open, the speed of the vehicle approaching zero, lift solenoid 537 and/or lift solenoid 637 forcing the retraction of rod 519 and/or 619 into their respective cases, etc.

In addition to the position solenoid 1053, other optional elements can be combined with the dynamic load-compensating spring. Some of these elements include a pressure regulating passage extension 1073 (FIGS. 10 and 12), which is a conduit to conduct the pressure signal to several spring cylinders from one lift cylinder. A pressure regulating passage 1126 (FIG. 11), which is a conduit to communicate the internal pressure of lift cylinder 565 to poppet valve end cap 678 in spring cylinder 655, ensuring the internal pressures of the two cylinders are kept nearly equal.

In the case of a vehicle suspension, a lateral support 1145 (FIG. 11) secures the cases of the lift cylinder and of the spring cylinder to each other in a fixed relationship at one end of a vehicle structural member. An annular member is secured to the other end of the structural member. The annular member slides along a rod which is part of a lateral frame support 1146, preventing horizontal movement of the assembled cylinder cases while permitting the assembled cylinder cases and the dynamic load to move vertically with relation to one another.

The lateral frame support 1146 consists of a structural rod having anchors at its ends which secure it to the dynamic load. The rod in the lateral frame support allows lateral support 1145 to move vertically, while preventing horizontal movement of the lateral support or the assembled cylinder cases.

A membrane pressure accumulator 1169 (FIG. 11) consists of an impermeable membrane 1171 separating the compressible gas from the fluid below it.

The membrane 1171 (FIG. 11) used in the membrane pressure accumulator, shown above the poppet valve end cap 678 in the spring cylinder as an additional or alternate method of absorbing vibration in the fluid caused by rapid movement of the poppet valve end cap 678.

The use of these various elements is described in greater detail. The pressure regulating passage extension 1073 is shown in FIG. 10 allows the regulation of the internal fluid pressure of other spring cylinders from the single lift cylinder. The cross sectional area of the rod in lift cylinder 565 and the cross sectional area of the rod in spring cylinder 655 must match in the preferred embodiment to ensure the respective internal pressures are equal when the dynamic load is properly supported. The rod for lift cylinder 565 shown in FIG. 12 and in FIG. 10 is significantly thicker than that shown for spring cylinder 655, allowing the possibility that a second spring cylinder could be controlled by the single lift cylinder, as shown in FIG. 12.

Note that the embodiment shown in FIG. 12 reflects 'flipping' the dynamic load-compensating fluid spring; lift spring 565 supports a structural member 1281, which in turn supports two spring cylinders 655, both of which provide support for dynamic load 102. The unique biased nature of the support offered by the fluid spring allows the support of heavy stationary equipment in such a manner—the stationary equipment (dynamic load 102), the spring cylinders, and the structural member 1281 are all supported by lift cylinder 565, and all contribute to its internal fluid pressure. The position control 704 maintains the desired length of the lift cylinder, and the spring cylinders absorb any shock which originates in the stationary equipment by ensuring the internal fluid pressure of each of the spring cylinders nearly matches that of the lift cylinder at each moment. The total cross sectional area of the spring cylinders' rods shown in FIG. 12 is equal to the cross sectional area of the lift cylinder rod. A number of components have been removed from the dynamic load-compensating fluid spring (e.g. the steering sleeve and steering linkage have been removed from the spring cylinders, and the preload accumulator and frame stop have been removed from the lift cylinder, etc.), as these are not necessary to the function of such an equipment support.

Returning to FIG. 10, note that no structural connection has been indicated between the spring cylinder and the lift cylinder. Such a connection is necessary in this embodiment of the fluid spring (as indicated in FIG. 12); the components shown in FIG. 10 are intended only to reflect the interconnection of fluid linkages. Also note that lift solenoids 537 and 637 are depicted with connections only to pressure equalization passages 534 and 634, respectively. Additional connections to variably restricted pressure feed 562 and fluid relief line 564 (as indicated in FIG. 8 and FIG. 9) are not shown in FIG. 10 for purposes of clarity.

FIG. 11 reflects the direct connection of spring cylinder 655 to lift cylinder 565 (each cylinder having equal rod sizes), balancing the internal fluid pressures through a pressure equalization passage 1126. Membrane pressure accumulator 1169 has been added to the upper end of spring cylinder 655, to provide enhanced absorption of high frequency fluid movements through membrane 1171. The relative positions of the fluid spring and the dynamic load is determined and maintained by position control 704. Should the position control cause lift cylinder to extend or retract, the vertical movement of the dynamic load-compensating fluid spring and the dynamic load relative to one another is absorbed by a set of lateral supports 1145 sliding vertically on a corresponding set of lateral frame supports 1146.

The preferred combined embodiment shown in FIG. 11 allows the development of a vehicular suspension which isolates the steering linkage in spring cylinder 655 from the rapid vertical motion of the wheel support. The preferred combined embodiment also permits the wheel support to remain truly vertical throughout its total range of travel, and eliminates the need for conventional springs, shock absorbers, torsion bars, frame stops, upper and lower control arms, conventional leveling devices, etc.

Accordingly, it can be seen that a variety of vehicles (cars, trucks, trains, etc.) can benefit from the dynamic load-compensating fluid spring. The fluid spring has the additional advantage that it provides all the above mentioned improvements in a variety of positions. Variation of the internal pressures of the components is inherent in the design, and will accommodate a wide variety of load conditions.

Although the description above contains many specific details, these should not be construed as limiting the scope of the invention but as merely providing illustrations of some of the presently preferred embodiments of this invention. Various other embodiments and ramifications are possible within its scope.

For example, the dynamic load-compensating fluid spring can be readily adapted for use in supporting buildings that may be subjected to shocks from earthquakes. Alternatively, heavy stationary equipment (presses, etc.) can be supported by the fluid spring by inverting the fluid spring as shown in FIG. 9C to absorb shocks which originate in the stationary equipment. This inverted application demonstrates the biased nature of the support offered by the fluid spring. In a similar manner, the fluid spring can be used in horizontal applications to transmit axial forces from one direction, while absorbing axial forces from the opposite direction.

This unique 'one-way' spring action is enhanced by the ability of the fluid spring to respond selectively to its operating environment in response to a simple arrangement of sensors.

Thus the scope of the invention should be determined by the appended claims and their legal equivalents, rather than by the examples given. The materials, components, interconnectivity, sizes, shapes, orientation, etc. can be varied.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. An adjustable support for supporting a dynamic load relative to a foundation at an inertial position independent of the foundation, the adjustable support comprising:
    a housing having a hollow interior and an upper end and an open lower end that provides access to the housing hollow interior;
    a piston having a head and a rod extending from the head, the head being slidably received within the hollow interior of the housing, and the rod extending through the open lower end of the housing and adapted to be operably connected to the foundation;
    a valve slidably mounted within the housing hollow interior above the piston head, forming a fluid tight seal relative to the housing and dividing the interior of the housing into a first fluid chamber filled with a compressible gas above the valve and a second fluid chamber between the valve and the piston head, and the first and second fluid chambers are fluidly isolated relative to each other;
    wherein the valve isolates the load and the foundation such that the pressure in the first fluid chamber corresponds to a force of the load acting on the valve and the pressure in the second fluid chamber corresponds to a force of the foundation acting on the valve and the valve is slidable from a neutral position to a first position for admitting fluid into the second fluid chamber and from the neutral position to a second position for discharging fluid from the second fluid chamber to equalize the pressure of the second chamber with that of the first chamber and thereby extend or retract the rod from the housing to substantially maintain the dynamic load at its inertial position.

2. An adjustable support according to claim 1 wherein the fluid in the second chamber is a liquid.

3. An adjustable support according to claim 1 and further comprising:
    a fluid supply passage extending between first and second openings in the housing, with the first opening corresponding to the axial position of the valve and the second opening corresponding to the axial position of the piston;
    a fluid relief passage extending between first and second openings in the housing, with the first opening corresponding to the axial position of the valve and the second opening corresponding to the axial position of the piston; and
    wherein the piston is moveable from a neutral position where the piston closes both the second openings of the supply and relief passages to a first position where the piston closes the second opening to the relief passage and opens the second opening to the supply passage and a second position where the piston closes the second opening to the supply passage and opens the second opening to the relief passage, wherein fluid is supplied to the second chamber when at least one of the valve and piston are in the first position and fluid is removed from the second chamber when at least one of the valve and piston are in the second position.

4. An adjustable support according to claim 3 wherein the valve has first and second axially spaced channels, the first channel is adapted to fluidly connect the first opening of the supply passage to a source of pressurized fluid when the valve is in the neutral position and the second channel is adapted to fluidly connect the first opening relief passage to a fluid reservoir when the valve is in the neutral position.

5. An adjustable support according to claim 4 wherein the valve further comprises a third channel axially disposed between the first and second channels and an axial passage connecting the third channel to the second chamber and wherein when the valve is in the neutral position, fluid relief and fluid supply to the second chamber through the third channel is prevented, when the valve moves toward the first position fluid supply is permitted to the second chamber through the third channel, and when the valve moves toward the second position fluid relief is permitted from the second chamber through the third channel.

6. An adjustable support according to claim 3 and the valve further comprising a poppet valve mounted within the valve, the poppet valve is slidable from a first position where no fluid flows through the poppet valve to a neutral position for admitting fluid to and releasing fluid from the second chamber.

7. An adjustable support according to claim 6 wherein the housing comprises a first housing and a second housing, the first housing containing the valve, piston, and second chamber, the second housing having a second piston comprising a head received within the second housing and a rod extending from the second housing, and a conduit extending between the first and second housings with the poppet valve disposed in the conduit to operably connect the first and second housings.

8. An adjustable support according to claim 7 wherein the second piston head comprises a bore in which is slidably mounted an accumulator piston to divide the first chamber into an accumulator portion that is filled with a compressible gas and a fluid portion in fluid communication with the poppet valve and is filled with an incompressible fluid, wherein relatively high frequency changes in the dynamic load will be countered by compression and expansion of the compressible gas in response to the movement of the accumulator piston and medium to large changes in the dynamic load will be countered by the compression and expansion of the compressible gas and transferred to the valve.

9. An adjustable support according to claim 8 and further comprising an equalization passage extending between the second housing near the upper end and the first chamber to equalize the pressure on opposite sides of the second piston head.

10. An adjustable support according to claim 1 wherein the upper end of the housing is adapted to be fixedly connected to the dynamic load.

11. An adjustable support according to claim 1 and further comprising a valve spring biasing the valve into the neutral position.

12. An adjustable support according to claim 1, and further comprising a first valve controlling the flow of fluid through the supply passage, a second valve controlling the flow of fluid through the relief passage, and the first and second valves prohibit the flow of fluid through the supply and relief passages, respectively, when the valve is not in the neutral position.

13. A method for supporting a load movable relative to a foundation, wherein the load is dynamically variable in at least one parameter, and wherein the load is held at a predetermined inertial state by an adjustable support extending between and operably connected to the load and the foundation, the method comprising:
sensing a parameter of at least one of the predetermined inertial state and the load;
isolating forces applied to the adjustable support by the load from forces applied to the adjustable support by the foundation; and
adjusting the length of the adjustable support to maintain the load in the predetermined inertial state responsive to the sensed parameter of at least one of the predetermined inertial state and the load.

14. The method of claim 13 wherein the step of adjusting the adjustable support comprises adjusting the length of the adjustable support.

15. The method of claim 13 wherein the adjustable support comprises a housing having a hollow interior and an upper end and an open lower end that provides access to the housing hollow interior, a piston having a head and a rod extending from the head, the head being slidably received within the hollow interior of the housing, and the rod extending through the open lower end of the housing and adapted to be operably connected to the foundation, and a valve slidably mounted within the housing hollow interior above the piston head, forming a fluid tight seal relative to the housing and dividing the interior of the housing into a first fluid chamber above the valve and a second fluid chamber between the valve and the piston head, and wherein the step of adjusting the adjustable support comprises adding or removing fluid from the second chamber.

16. The method of claim 15 wherein the adjustable support further comprises a second piston having a head and a rod extending from the head, the head being slidably received within the hollow interior of the housing above the valve, and the rod extending through the upper end of the housing and adapted to be operably connected to the dynamic load and the step of adjusting the adjustable support further comprises the step of increasing or decreasing the volume of the first chamber to change the inertial position of the dynamic load to a new predetermined inertial position.

17. The method of claim 16 wherein the step of changing the inertial position of the dynamic load to a new predetermine inertial position comprises the step of first setting at least one operational parameter of the dynamic load, sensing the changes in the at least one operational parameter, and then changing the inertial position in response to the sensed changes in the operation parameters.

18. The method of claim 17 wherein the foundation is the ground and the dynamic load is a vehicle with at least one ground engaging wheel assembly and the sensed operational parameter is one of vehicle ride height, speed, acceleration, braking, and cornering.

19. The method of claim 13 wherein the step of adjusting the adjustable support further comprises rotating the adjustable support relative to the dynamic load.

20. The method of claim 13 and further comprising the step of setting the inertial state of the dynamic load to a new inertial state in response to operational conditions of the dynamic load.

21. The method of claim 20 wherein the step of setting the inertial state of the load comprises sensing the changes of the operational conditions of the dynamic load and adjusting the length of the adjustable support in response to the sensed operation conditions.

22. The method of claim 13 wherein the sensing step further comprises sensing an input force acting on one of the foundation and the load, and the input force being capable of changing the at least one parameter of the predetermined inertial state and the load.

23. The method of claim 22 wherein the input force is a reaction force to an external force Acting on one of the load and the foundation.

24. The method of claim 23 wherein the reaction force is in response to the movement of the load over an irregular surface on the foundation.

25. The method of claim 24 wherein the foundation is a road surface.

26. The method of claim 25 wherein the reaction force is in response to air pressure acting on the load.

27. The method of claim 22 wherein the step of adjusting the adjustable support comprises applying motive force to the adjustable support to neutralize the input force.

28. The method of claim 27 wherein the step of applying the motive force includes the step of altering the length of the adjustable support relative to an initial position.

29. The method of claim 28 wherein the step of altering the length of the adjustable support includes returning the adjustable support to the initial position.

30. The method of claim 13 wherein the sensing step further comprises sensing a change in a parameter of the load.

31. The method of claim 30 wherein the parameter of the load is one of mass, center of gravity, acceleration, and weight.

32. The method of claim 13 and further comprising the step of determining whether the sensed parameters will alter the predetermined inertial state.

33. The method of claim 13 and further comprising the step of isolating a sensed change in parameter of the load from a sensed change in a parameter of the predetermined inertial state.

34. The method of claim 33 and fuirther comprising the step of determining whether the sensed parameters will alter the predetermined inertial state.

35. The method of claim 13 and further comprising the step of determining whether the sensed parameters will alter the predetermined inertial state.

36. A dynamic load compensator for supporting a dynamic load relative to a foundation at an inertial position independent of the foundation, the dynamic load compensator comprising:
   a support disposed between the load and the foundation, wherein the support is adjustable along at least one axis for movement of the load relative to the foundation;
   a motive force supply to provide an adjustment force to/from the support;
   a controller operably interconnected to the motive force supply and to the support for controlling the amount of motive force applied to/from the support;
   a load sensor operably interconnected to the controller and at least one of the support and the load to detect at least one parameter of the inertial position of the load; and
   wherein at least one of the controller and the load sensor isolates the dynamic load from the foundation whereby the support is independently adjustable in response to a force imparted to the support by the foundation and to a force imparted to the load sensor by the load for adjusting the dynamic load relative to the foundation in different manners depending upon whether the force is imparted by the load or by the foundation;
   the support comprises a housing having a hollow interior, the motive force supply comprises a source and accumulator of pressurized fluid, and the controller comprises a valve positioned within the housing, dividing the interior of the housing into a first chamber and a second chamber, and moveable from a neutral position to a first position for admitting fluid into the housing from the source and to a second position for discharging fluid from the housing into the accumulator in response to the sensed parameter of the inertial position and maintain the load at the predetermined inertial position; and
   the sensor comprises a pressure accumulator filled with compressible gas and operably connected to the valve wherein the relative force acting on the valve is transferred to the pressure accumulator resulting in a corresponding compression or expansion of the compressible gas, enabling the valve to slide from the neutral position to either the first or second position to equalize the pressure in the first and second chambers and isolating the load from the foundation.

37. A dynamic load compensator according to claim 36, wherein the support further comprises a piston having a head received within the housing and spaced from the valve to define a fluid chamber therebetween fluidly connected to the source of pressurized fluid, and a rod extending from the head, out of the housing and operably connected to the foundation, wherein any force acting to change the load or foundation is transferred to the valve through the relative movement of the housing and piston, which is transferred to the valve through the fluid chamber to form the sensor and the relative movement of the housing and the piston define the sensed parameter.

38. A dynamic load compensator according to claim 37, wherein a second fluid chamber is formed between the piston and the housing and is filled with a pressurized fluid to bear against and retard the movement of the piston in response to the relative movement of the housing and piston.

39. A dynamic load compensator according to claim 36 and further comprising:
   a piston having a head and a rod extending from the head, the head being slidably received within the hollow interior of the housing, and the rod extending through the open lower end of the housing and adapted to be operably connected to the foundation;
   a fluid supply passage fluidly connecting the fluid source to the housing near the piston;
   a fluid relief passage fluidly connecting the fluid accumulator to the housing near the piston; and
   wherein the piston is moveable from a neutral position where the piston closes both the fluid supply and fluid relief passages to a first position where the piston closes the fluid relief passage and opens the fluid supply passage to introduce fluid on the side of the piston head opposite the fluid chamber and a second position where the piston closes the fluid supply passage and opens the fluid relief passage to remove fluid from the fluid chamber.

40. A dynamic load compensator according to claim 39 wherein the valve permits the flow of fluid through the fluid relief and fluid supply passages when the valve is in the neutral position.

41. A dynamic load compensator according to claim 40 wherein the valve has first and second axially spaced channels, the first channel fluidly connects the fluid supply passage to the fluid source when the valve is in the neutral position and the second channel fluidly connects the fluid relief passage to the accumulator when the valve is in the neutral position.

42. A dynamic load compensator according to claim 41 wherein the valve further comprises a third channel axially disposed between the first and second channels and an axial passage connecting the third channel to the fluid chamber and wherein when the valve is in the neutral position, fluid flow from fluid source and fluid accumulator to the fluid chamber through the third channel is prevented, when the valve moves toward the first position fluid flow from the fluid source to the fluid chamber is permitted through the third channel, and when the valve moves toward the second position fluid flow from the fluid chamber to the fluid accumulator is permitted through the third channel.

43. A dynamic load compensator according to claim 36 wherein the pressure accumulator comprises the first chamber filled with a compressible gas.

44. A dynamic load compensator support according to claim 43 wherein the pressure accumulator comprises a pressure chamber filled with a compressible gas and an accumulator piston slidably mounted within the pressure chamber and fluidly connected to the first chamber wherein the force acting on the valve is transferred to the accumulator piston resulting in a corresponding change in volume of the pressure chamber and thereby enabling a change in the volume of the first chamber to permit the sliding movement of the valve.

45. An adjustable support for supporting a dynamic load relative to a foundation at an inertial position independent of the foundation, the adjustable support comprising:
   a housing having a hollow interior and an upper end and an open lower end that provides access to the housing hollow interior;
   a piston having a head and a rod extending from the head, the head being slidably received within the hollow interior of the housing, and the rod extending through the open lower end of the housing and adapted to be operably connected to the foundation;

a valve slidably mounted within the housing hollow interior above the piston head, forming a fluid tight seal relative to the housing and dividing the interior of the housing into a first fluid chamber above the valve and a second fluid chamber between the valve and the piston head;

wherein the valve is slidable from a neutral position to a first position for admitting fluid into the second chamber and from the neutral position to a second position for discharging fluid from the second chamber and the first chamber is operably connected to the dynamic load so that any change in the dynamic load correspondingly changes the pressure in the first chamber to move the valve to either one of the first and second positions to admit or release fluid from the second chamber as necessary to equalize the pressure of the second chamber with that of the first chamber and extend or retract the rod from the housing to substantially maintain the dynamic load at its inertial position;

a fluid supply passage extending between first and second openings in the housing, with the first opening corresponding to the axial position of the valve and the second opening corresponding to the axial position of the piston;

a fluid relief passage extending between first and second openings in the housing, with the first opening corresponding to the axial position of the valve and the second opening corresponding to the axial position of the piston; and wherein the piston is moveable from a neutral position where the piston closes both the second openings of the supply and relief passages to a first position where the piston closes the second opening to the relief passage and opens the second opening to the supply passage and a second position where the piston closes the second opening to the supply passage and opens the second opening to the relief passage, wherein fluid is supplied to the second chamber when the valve is in the neutral position and the piston is in the first position and fluid is removed from the second chamber when the valve is in the neutral position and the piston is in the second position.

46. An adjustable support according to claim 45 wherein the valve has first and second axially spaced channels, the first channel is adapted to fluidly connect the first opening of the supply passage to a source of pressurized fluid when the valve is in the neutral position and the second channel is adapted to fluidly connect the first opening relief passage to a fluid reservoir when the valve is in the neutral position.

47. An adjustable support according to claim 46 wherein the valve further comprises a third channel axially disposed between the first and second channels and an axial passage connecting the third channel to the second chamber and wherein when the valve is in the neutral position, fluid relief and fluid supply to the second chamber through the third channel is prevented, when the valve moves toward the first position fluid supply is permitted to the second chamber through the third channel, and when the valve moves toward the second position fluid relief is permitted from the second chamber through the third channel.

48. An adjustable support according to claim 47 and the valve further comprising a poppet valve mounted within the valve, the poppet valve is slidable from a first position where no fluid flows through the poppet valve to a neutral position for admitting fluid to and releasing fluid from the second chamber.

49. An adjustable support according to claim 48 wherein the housing comprises a first housing and a second housing, the first housing containing the valve, piston, and second chamber, the second housing containing the first chamber and having a second piston with a head received within the second housing and a rod extending from the second housing, and a conduit extending between the first and second housings with the poppet valve disposed in the conduit to operably connect the first and second housings.

50. An adjustable support according to claim 49 wherein the second piston head comprises a bore in which is slidably mounted an accumulator piston to divide the first chamber into an accumulator portion that is filled with a compressible gas and a fluid portion in fluid communication with the poppet valve and is filled with an incompressible fluid, wherein relatively high frequency changes in the dynamic load will be countered by compression and expansion of the compressible gas in response to the movement of the accumulator piston and medium to large changes in the dynamic load will be countered by the compression and expansion of the compressible gas and transferred to the valve.

51. An adjustable support according to claim 50 and further comprising at least one equalization passage extending between the second housing above the second piston head and the first chamber to equalize the pressure on opposite sides of the second piston head.

52. An adjustable support according to claim 45, and further comprising a first valve controlling the flow of fluid through the supply passage, a second valve controlling the flow of fluid through the relief passage, and the first and second valves prohibit the flow of fluid through the supply and relief passages, respectively, when the valve is not in the neutral position.

53. A method for supporting a load movable relative to a foundation, wherein the load is dynamically variable in at least one parameter, and wherein the load is held at a predetermined inertial state by an adjustable support extending between and operably connected to the load and the foundation, the method comprising:

providing an adjustable support comprising:
a housing having a hollow interior and an open upper end and an open lower end that provides access to the housing hollow interior,
a piston having a head and a rod extending from the head, the head being slidably received within the hollow interior of the housing, and the rod extending through the open lower end of the housing and adapted to be operably connected to the foundation,
a valve slidably mounted within the housing hollow interior above the piston head, forming a fluid tight seal relative to the housing and dividing the interior of the housing into a first fluid chamber above the valve and a second fluid chamber between the valve and the piston head, and
a second piston having a head and a rod extending from the head, the head being slidably received within the hollow interior of the housing above the valve, and the rod extending through the open upper end of the housing and adapted to be operably connected to the dynamic load;

sensing a parameter of at least one of the predetermined inertial state and the load;

adjusting the adjustable support to maintain the load in the predetermined inertial state responsive to the sensed parameter of at least one of the predetermined inertial state and the load by adding or removing fluid from the second chamber to equalize the pressure of the second chamber with that of the first chamber.

54. The method of claim 53 and further comprising the step of changing the inertial position of the dynamic load to a new predetermined inertial position by setting at least.one operational parameter of the dynamic load, sensing the changes in the at least one operational parameter, and then changing the inertial position in response to the sensed changes in the operation parameters.

55. The method of claim 54 wherein the foundation is the ground and the dynamic load is a vehicle with at least one ground engaging wheel assembly and the sensed parameter is one of vehicle ride height, speed, acceleration, braking, and cornering.

56. A dynamic load compensator for supporting a dynamic load relative to a foundation at an inertial position independent of the foundation, the dynamic load compensator comprising:
  a support disposed between the load and the foundation and comprising a housing having a hollow interior and a piston having a head and a rod extending from the head, the head being slideably received within the hollow interior of the housing and operably connected to the foundation, wherein the support is adjustable along at least one axis for movement of the load relative to the foundation;
  a motive force supply comprising a source and accumulator of pressurized fluid to provide an adjustment force to/from the support;
  a controller comprising a valve positioned within the housing and defining a fluid chamber, between the valve and the piston head, that is fluidly connected to the source and accumulator, the valve is moveable from a neutral position to a first position to fluidly connect the first chamber to the source for admitting fluid from the source into the fluid chamber, and from the neutral position to a second position to fluidly connect the fluid chamber to the accumulator for discharging fluid from the fluid chamber to control the amount of motive force applied to/from the support;
  a fluid supply passage fluidly connecting the fluid source to the housing near the valve;
  a fluid relief passage fluidly connecting the fluid accumulator to the housing near the valve;
  wherein the valve is moveable from a neutral position where the valve closes both the fluid supply and fluid relief passages to a first position where the valve closes the fluid relief passage and opens the fluid supply passage to introduce fluid on the side of the valve opposite the fluid chamber and a second position where the valve closes the fluid supply passage and opens the fluid relief passage to remove fluid from the fluid chamber;
  the valve has first and second axially spaced channels, the first channel fluidly connects the first fluid supply passage to the fluid source when the valve is in the neutral position and the second channel fluidly connects the fluid relief passage to the accumulator when the valve is in the neutral position;
  a load sensor operably interconnected to the controller and at least one of the support and the load to detect at least one parameter of the inertial position of the load;
  wherein at least one of the controller and the load sensor isolates the dynamic load from the foundation and any force acting on the load or foundation is transferred to the valve through the relative movement of the housing and piston, transferring the force to the valve through the fluid chamber, wherein the valve forms the sensor and the relative movement of the housing and the piston define the sensed parameter, whereby the support is independently adjustable in response to a force imparted to the support by the foundation and to a force imparted to the load sensor by the load to adjust the dynamic load relative to the foundation in different manners depending upon whether the force is imparted on the load or the foundation.

57. A dynamic load compensator according to claim 56, wherein a second fluid chamber is formed between the valve and the housing and is filled with a pressurized fluid to bear against and retard the movement of the valve in response to the relative movement of the housing and piston.

58. A dynamic load compensator according to claim 57 wherein the valve further comprises a third channel axially disposed between the first and second channels and an axial passage connecting the third channel to the fluid chamber and wherein when the valve is in the neutral position, fluid flow from the fluid source and the fluid accumulator to the fluid chamber through the third channel is prevented, when the valve moves toward the first position, fluid flow from the fluid source to the fluid chamber is permitted through the third channel, and when the valve moves toward the second position fluid flow from the fluid chamber to the fluid accumulator is permitted through the third channel.

59. A method for supporting a load movable relative to a foundation, wherein the load is dynamically variable in at least one parameter, and wherein the load is held at a predetermined inertial state by an adjustable support extending between and operably connected to the load and the foundation, the method comprising:
  sensing a parameter of at least one of the predetermined inertial state and the load;
  sensing a reaction force responsive to air pressure acting on one of the load or foundation and the reaction force being capable of changing the at least one sensed parameter of the predetermined inertial state and the load;
  isolating forces applied to the adjustable support by the load from forces applied to the adjustable support by the foundation; and
  adjusting the adjustable support to maintain the load in the predetermined inertial state responsive to the sensed parameter of at least one of the predetermined inertial state and the load.

60. An adjustable support for supporting a dynamic load relative to a foundation at an inertial position independent of the foundation, the adjustable support comprising:
  a housing having a hollow interior and an upper end and an open lower end that provides access to the housing hollow interior;
  a piston having a head and a rod extending from the head, the head being slidably received within the hollow interior of the housing, and the rod extending through the open lower end of the housing and adapted to be operably connected to the foundation;
  a valve slidably mounted within the housing hollow interior above the piston head, forming a fluid tight seal relative to the housing and dividing the interior of the housing into a first fluid chamber above the valve and a second fluid chamber between the valve and the piston head, and the first and second fluid chambers are fluidly isolated relative to each other;

wherein the valve isolates the load and the foundation such that the pressure in the first fluid chamber corresponds to a force of the load acting on the valve and the pressure in the second fluid chamber corresponds to a force of the foundation acting on the valve and the valve is slidable from a neutral position to a first position for admitting fluid into the second fluid chamber and from the neutral position to a second position for discharging fluid from the second fluid chamber to equalize the pressure of the second chamber with that of the first chamber and thereby extend or retract the rod from the housing to substantially maintain the dynamic load at its inertial position; and and further comprising a pressure accumulator filled with compressible gas and operably connected to the valve wherein the relative force acting on the valve is transferred to the pressure accumulator resulting in a corresponding compression or expansion of the compressible gas, enabling the valve to slide from the neutral position to either the first or second position to equalize the pressure in the first and second chambers and isolating the load from the foundation.

61. An adjustable support according to claim 60 wherein the pressure accumulator comprises the first chamber filled with a compressible gas.

62. An adjustable support according to claim 60 wherein the pressure accumulator comprises a pressure chamber filled with a compressible gas and an accumulator piston slidably mounted within the pressure chamber and fluidly connected to the first chamber wherein the force acting on the valve is transferred to the accumulator piston resulting in a corresponding change in volume of the pressure chamber and thereby enabling a change in the volume of the first chamber to permit the sliding movement of the valve.

* * * * *

UNITED STATES PATENT AND TRADEMARK OFFICE
CERTIFICATE OF CORRECTION

PATENT NO. : 6,217,010 B1
DATED : April 17, 2001
INVENTOR(S) : McNeely

Page 1 of 1

It is certified that error appears in the above-identified patent and that said Letters Patent is hereby corrected as shown below:

Column 42, claim 23,
Line 48, "Acting" should read -- acting --;

Column 45, claim 46,
Line 10, "a neutral" should read -- the neutral --;
Line 34, "a neutral" should read -- the neutral --;

Signed and Sealed this

Eighth Day of January, 2002

Attest:

JAMES E. ROGAN
Attesting Officer
Director of the United States Patent and Trademark Office